US010650065B2

(12) United States Patent
Savarkar et al.

(10) Patent No.: US 10,650,065 B2
(45) Date of Patent: May 12, 2020

(54) METHODS AND SYSTEMS FOR AGGREGATING DATA FROM WEBPAGES USING PATH ATTRIBUTES

(71) Applicant: Rovi Guides, Inc., San Carlos, CA (US)

(72) Inventors: Abhijit Satchidanand Savarkar, Andover, MA (US); Sai Rahul Reddy Pulikunta, Andover, MA (US); Sankar Ardhanari, Windham, NH (US); Ganesh Ramamoorthy, Andover, MA (US)

(73) Assignee: Rovi Guides, Inc., San Jose, CA (US)

( * ) Notice: Subject to any disclaimer, the term of this patent is extended or adjusted under 35 U.S.C. 154(b) by 304 days.

(21) Appl. No.: 15/173,056

(22) Filed: Jun. 3, 2016

(65) Prior Publication Data

US 2017/0249319 A1    Aug. 31, 2017

Related U.S. Application Data

(60) Provisional application No. 62/300,677, filed on Feb. 26, 2016.

(51) Int. Cl.
*G06F 17/30* (2006.01)
*G06F 16/951* (2019.01)

(52) U.S. Cl.
CPC .................. *G06F 16/951* (2019.01)

(58) Field of Classification Search
CPC ......... G06F 17/30864; G06F 17/30058; G06F 17/3089; G06F 16/951

USPC ........................................................ 707/770
See application file for complete search history.

(56) References Cited

U.S. PATENT DOCUMENTS

| 6,549,922 | B1 * | 4/2003 | Srivastava | ........ G06F 17/30017 |
| 7,162,691 | B1 * | 1/2007 | Chatterjee | ......... G06F 17/30864 |
| | | | | 707/E17.108 |
| 7,440,967 | B2 | 10/2008 | Chidlovskii | |
| 7,584,194 | B2 | 9/2009 | Tuttle et al. | |
| 7,827,123 | B1 * | 11/2010 | Yagnik | ................. G06N 99/005 |
| | | | | 706/12 |
| 8,346,789 | B2 * | 1/2013 | Klein, Jr. | .......... G06F 17/30038 |
| | | | | 707/758 |

(Continued)

FOREIGN PATENT DOCUMENTS

CN         101101600 A    1/2008

*Primary Examiner* — Shiow-Jy Fan
(74) *Attorney, Agent, or Firm* — Haley Guiliano LLP

(57) ABSTRACT

Methods and systems that improve the ability of a media guidance application to aggregate information from one or more sources and one or more mediums. For example, the media guidance application may automatically collect information based on attributes associated with information of a particular type. Specifically, the media guidance application may determine based on comparison with verified training data that one source or medium typically associates information of a particular type, for example, "Actor," with one or more path attributes, for example, a location in a directory structure. The media guidance application may then search the source or medium for the one or more path attributes. Upon detecting the one or more path attributes, the media guidance application may designate any sub-set of information associated with the one or more path attributes as a particular type of information.

20 Claims, 11 Drawing Sheets

(56) References Cited

U.S. PATENT DOCUMENTS

| | | |
|---|---|---|
| 9,235,813 B1 | 1/2016 | Qian et al. |
| 2003/0135517 A1* | 7/2003 | Kauffman ......... G06F 17/30011 |
| 2006/0101058 A1* | 5/2006 | Chidlovskii ........ G06F 17/2247 |
| 2006/0230011 A1* | 10/2006 | Tuttle ................ G06F 17/30864 |
| | | 706/62 |
| 2006/0253411 A1* | 11/2006 | Roy-Chowdhury ......................... |
| | | G06F 17/3089 |
| 2009/0240719 A1 | 9/2009 | Ramasubramanian et al. |
| 2010/0153515 A1* | 6/2010 | Lau ........................... G06F 8/34 |
| | | 709/217 |
| 2014/0006423 A1* | 1/2014 | Melnychenko ... G06F 16/24578 |
| | | 707/749 |

\* cited by examiner

METHODS AND SYSTEMS FOR AGGREGATING DATA FROM WEBPAGES USING PATH ATTRIBUTES

CROSS-REFERENCE TO RELATED APPLICATIONS

This application claims priority benefit under 35 U.S.C. § 119(e) from U.S. provisional application No. 62/300,677, filed on Feb. 26, 2016. The aforementioned, earlier-filed application is hereby incorporated by reference herein in its entirety.

BACKGROUND

In traditional systems, media guidance data is available from many sources and through many mediums. However, given the number of different sources and different mediums, it is often difficult to aggregate this information into a single collection. In many such systems, users manually input data into the appropriate format for a database. This process may be arduous and error prone. While scripts known as web crawlers can help automate the process, significant user input is still required as the user must designate the structures to retrieve information from. Additionally, many such web crawlers merely search the rendered text of webpages without examining the source code of the webpages.

SUMMARY

Accordingly, methods and systems are described herein for a media guidance application that improves the ability to aggregate information from one or more sources and one or more mediums. For example, the media guidance application may automatically collect information based on path attributes associated with information of a particular type. Specifically, the media guidance application may determine based on comparison with verified training data that one source or medium typically associates information of a particular type, for example, "Actor," with one or more path attributes, for example, a location in a directory structure. The media guidance application may then search the source or medium for the one or more path attributes. Upon detecting the one or more path attributes, the media guidance application may designate any sub-set of information associated with the one or more path attributes as a particular type of information.

By automatically collecting this information, the media guidance application may relieve a user from manually reviewing, collecting, and entering this information into a collection. Additionally, the media guidance application may continually check the accuracy of the information collected by basing designations off of associations with different path attributes. The method also has advantages over web crawlers that merely scan webpages for textual information (e.g., search for a word near the word "Title" and assume it is the title of a media asset), since the structure of webpages is often complicated and in many cases words that appear next to each other on the webpage do not appear nearby in the source code, leading to errors where the crawler returns incorrect data. The below systems and methods, by examining the structure (hereinafter referred to as "path attributes") of the webpage, provide substantially increased accuracy of the data retrieved from websites.

In some aspects, the media guidance application may retrieve a first webpage of a website, wherein the first webpage is associated with a first media asset. For example, the media guidance application may act as a web crawler that crawls various webpages and websites searching for information contained in those websites to categorize. It should be noted that the embodiments described herein, while often described in relation to websites and webpages, may be applied to any medium for electronically storing or electronically consuming information (e.g., computer files). It should be noted that the embodiments described herein, while often described in relation to information about media assets, may be applied to information of any type.

The media guidance application may select, from a database of a plurality of verified media descriptors, a verified media descriptor for the first media asset, wherein each of the plurality of verified media descriptors is associated with one of a plurality of media descriptor types. The verified media descriptor may refer to a known or "true" value of a particular media descriptor for the media asset. In some embodiments, a media descriptor may be a name of a genre, a director, a title, a release date, an actor, a producer, a subject matter, or a graphic associated with a media asset. Additionally or alternatively, the media descriptor may be any value (e.g., word, number, alphanumeric character string, etc.) that relates to information to be collected and/or categorized. For example, the media guidance application may select a verified media descriptor for the name of an actor (e.g., Matt Damon) staffing in the first media asset (e.g., "The Martian") from a database containing a plurality of verified media descriptors associated with "The Martian."

The media guidance application may match the verified media descriptor to a first media descriptor in the first webpage. By selectively querying the first webpage (e.g., its source code) for specific strings of text corresponding to verified media descriptors, the media guidance application operates efficiently since large portions of the source code may be irrelevant to the metadata extraction process. For example, the media guidance application may match the selected verified media descriptor (e.g., "Matt Damon") to a first media descriptor in the first webpage with the same string of characters (e.g., "Matt Damon"). The media guidance application may parse the source code of the webpage to identify the location where the same characters as the verified media descriptor (e.g., "Matt Damon") appear (e.g., the first media descriptor).

In some embodiments, the media descriptor type may be a genre, a director, a title, a release date, an actor, a producer, a subject matter, or a graphic. Additionally or alternatively, the media descriptor type may be any category for which information is being categorized into. In some embodiments, the database of the plurality of verified media descriptors for the first media asset is populated with manually verified descriptors for the first media asset. For example, a user may manually review verified media descriptors (e.g., the name of an actor appearing in a movie) to ensure that the media descriptor is accurate (e.g., the actor actually does appear in the movie).

The media guidance application may analyze the first webpage to identify a first path attribute associated with the first media descriptor. For example, the media guidance application may analyze the source code of the first webpage near the location where the verified media descriptor was matched (e.g., the first media descriptor in the first webpage) for structural features of the source code (e.g., the first path attribute).

In some embodiments, the first path attribute includes a path and a format attribute, which is at least one of a location, a font, a size, or a color. For example, the format attribute may be any characteristic that distinguishes how the descriptor is presented that distinguishes from how other information is presented, while the path refers to the location in the directory structure. For example, one way of defining a location is by using the Xpath query language (sometimes referred to as x-path, X-path, xpath, or a similar name for the query language) which defines a path structure (hereinafter referred to as an "Xpath") for XML documents, allowing for consistent retrieval of information from said documents.

In response to identifying the first path attribute associated with the first media descriptor, the media guidance application may associate the first media descriptor with the media descriptor type of the verified media descriptor. For example, the media guidance application may determine that because the value (e.g., the name "Matt Damon") of the first media descriptor matches the value of the verified media descriptor (e.g., the name "Matt Damon"), as described above, the first media descriptor is of the same type as the verified media descriptor (e.g., an actor in the media asset).

Based on associating the first media descriptor with the media descriptor type, the media guidance application may generate a mapping of the first path attribute to the media descriptor type. For example, the media guidance application may determine that the first path attribute in web pages of a particular website always indicate a particular media descriptor type. In some embodiments, generating a mapping (e.g., determining an Xpath) of the first path attribute of the first webpage to the media descriptor type may further comprise generating code (e.g., a link, pointer, file path, etc.) that indicates that the media descriptor associated with the first path attribute in any webpage of the website is associated with the media descriptor type.

The media guidance application may retrieve a second webpage of the website, wherein the first webpage is associated with a second media asset. For example, the media guidance application may act as a web crawler that crawls through each web page in a web site in order to categorize and collect all of the information contained in the website.

The media guidance application may identify the first path attribute from the second webpage, wherein the first path attribute from the second webpage is associated with a second media descriptor. For example, as each web page organizes and presents information in a similar way, the media guidance application may use path attributes used to identify particular media descriptor types on a first page to identify particular media descriptor types on a second page.

The media guidance application may associate the second media descriptor with the media descriptor type based on the mapping. For example, the media guidance application may retrieve the mapping which indicates media descriptors associated with a particular path attribute are of a particular type. For example, the media guidance application may determine, and the mapping may indicate, that all media asset actors on a website are located at a particular Xpath, "/movie_title/genre/credits/@actor." As another example, the media guidance application may determine, and the mapping may indicate, that all media asset titles on the website include a format attribute, such as they are colored blue, in Times New Roman font, are bordered in black, are located in the upper-left hand corner, and/or are adjacent to a graphic.

The media guidance application may then store the association of the second media descriptor with the media descriptor type in a database of learned media descriptors for the second media asset. For example, the database of learned media descriptors for the second media asset may represent the data automatically collected and categorized for the second media asset based on the mapping.

In some embodiments, the media guidance application may compare the second media descriptor in the database of learned media descriptors for the second media asset to a second verified media descriptor of the media descriptor type from the database of a plurality of verified media descriptors for the second media asset, and may determine a first accuracy of the mapping based on the comparison. For example, the media guidance application may compare the data retrieved based on a mapping to data known to be correct in order to determine the accuracy of the mapping. For instance, the media guidance application may retrieve the value "Matt Damon" based on a first mapping. The media guidance application may determine that since the "true" value for the descriptor type "actor" is "Matt Damon," the first mapping is 100% accurate since the retrieved value and the stored verified, or "true," value are identical.

In some embodiments, the media guidance application may compare the first accuracy to a second accuracy of a different mapping, wherein the different mapping maps a second path attribute to the media descriptor type. In response to determining that the first accuracy is greater than the second accuracy, the media guidance application may select the mapping for use in associating the second descriptor with the descriptor type. For example, by comparing the accuracy of the data collected using one or more mappings, the media guidance application may select the best mapping (or best attribute to use) to accurately collect and categorize data. For instance, the media guidance application may retrieve the value "Matt Damon" for "actor" based on a first mapping to a first path attribute and the value "Matt DamonJessica Chastain" as a result of a second mapping to a second path attribute. The media guidance application may determine that since the verified or "true" value for the descriptor type "actor" is "Matt Damon," the first mapping is more accurate since the retrieved value and the stored verified values are identical and thus the media guidance application may choose the first mapping to use when crawling future webpages.

In some embodiments, the first path attribute may be randomly selected from a plurality of path attributes associated with the first media descriptor. For example, the media guidance application may continuously and randomly test for different path attributes to determine the most accurate path attribute to use to perform a mapping. Likewise, the first media descriptor may be randomly selected from a plurality of media descriptors for the first media asset. In this way, the media guidance application may test combinations of media descriptors and their corresponding path attributes to determine the most accurate mapping over a given dataset.

In some embodiments, the media guidance application may access a media guidance database containing metadata used to generate media asset listings in an electronic program guide. For example, the media guidance application may access a media guidance database stored either locally in memory remotely at a media guidance data source accessible via a communications network. The media guidance database may contain listings of programs in tables with corresponding metadata in fields of the tables, or as objects of a program listing class with variables instantiated based on the metadata for the program. The media guidance application may compare entries in the media guidance database with the database of learned descriptors. For example, the media guidance application may compare an entry for the movie, "The Martian" and its associated metadata (e.g., the name of the director of the movie) stored in the media guidance database with an entry also for "The Martian" stored in the database of learned descriptors (e.g., metadata crawled from a particular webpage).

The media guidance application may then determine a first field in the media guidance database corresponding to the second media asset and a second field in the database of learned descriptors corresponding to the second media asset are different. For example, the media guidance application may determine the media guidance database lists "Matt Dillon" as an actor in "The Martian," while the database of learned descriptors lists "Matt Damon" as an actor in "The Martian." The media guidance application may then determine that the two actor fields are different, as they contain different characters.

In some embodiments, the media guidance application may retrieve a first stored descriptor from the first field. For example, the media guidance application may retrieve the first stored descriptor by executing a database query language script, such as SQL, and utilizing the declarative "Select" command to access data in a particular table or expression. The media guidance application may retrieve a first stored descriptor "Matt Dillon." The media guidance application may retrieve a second stored descriptor from the second field. For example, the media guidance application may retrieve the second stored descriptor from the second field by executing a database query language script such as SQL, and utilizing the declarative "Select" command to access data in a particular table or expression. The media guidance application may retrieve a second stored descriptor "Matt Damon." The media guidance application may then compare corresponding characters of the first stored descriptor with those of the second stored descriptor. For example, the media guidance application may execute a script to parse through the retrieved descriptors by returning individual characters corresponding to indices in the string and comparing like indices. As an example, assuming skipping of white space, index [6] would return a first character "i" for the first stored descriptor and a second character "a" for the second stored descriptor.

The media guidance application may determine the first character does not correspond to the second character by comparing the ASCII codes or any other method of comparing two characters. The media guidance application may, in response to the first character of the first stored descriptor not corresponding to the second character of the second stored descriptor, determine the first entry and the second entry are different. For example, as described above, if the media guidance application determines any of the characters at a particular index do not match between the first and second stored descriptors, the media guidance application may determine that the first and second fields are different.

The media guidance application may, in response to the determining, update the first field in the media guidance database to match the second field in the database of learned descriptors. For example, after determining that "Matt Dillon" stored in a field in the media guidance database does not match "Matt Damon" stored in a field in the database containing learned descriptors, the media guidance application may update the media guidance database to reflect the field stored in the database containing learned descriptors (e.g., to "Matt Damon" from "Matt Dillon").

It should be noted that the systems and/or methods described above may be combined with, applied to, or used in accordance with, other systems, methods and/or apparatuses discussed both above and below.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
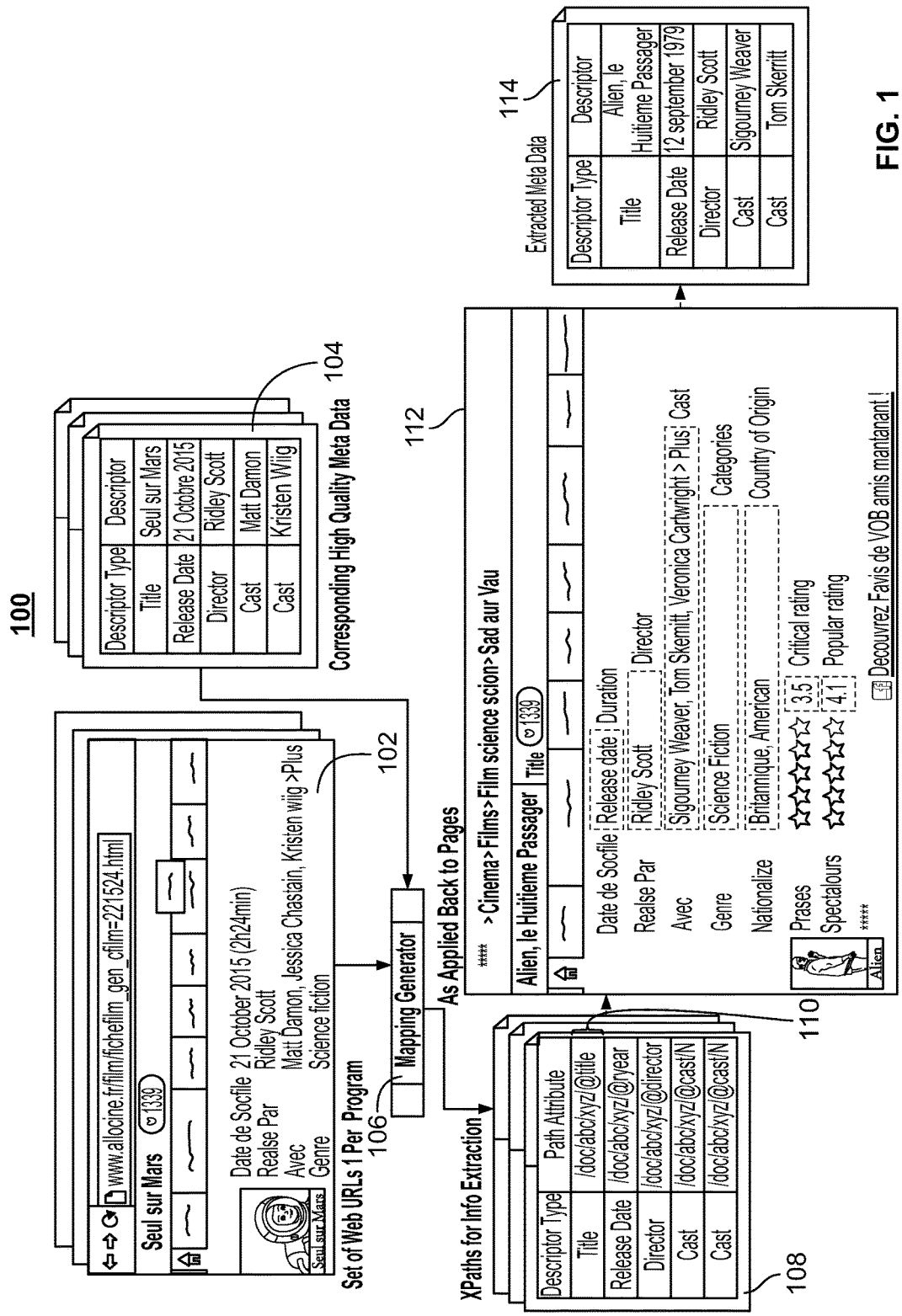
FIG. 1 is a block diagram showing the automatic collection of data based on mapping schemes in accordance with some embodiments of the disclosure.

Methods and systems are described herein for a media guidance application that improves the ability to aggregate information from one or more sources and one or more mediums. For example, the media guidance application may automatically collect information based on path attributes associated with information of a particular type. Specifically, the media guidance application may determine that one source or medium typically associates information of a particular type, for example, "Actor," with one or more path attributes, for example, a location in a directory structure. The media guidance application may then search the source or medium for the one or more path attributes. Upon detecting the one or more path attributes, the media guidance application may designate any sub-set of information associated with the one or more path attributes as a particular type of information.

By automatically collecting this information, the media guidance application may relieve a user from manually reviewing, collecting, and entering this information into a single collection. Additionally, the media guidance application may continually check the accuracies of the information collected by basing designations off of associations with different path attributes. The method also has advantages over web crawlers that merely scan webpages for textual information (e.g., search for a word near the word "Title" and assume it is the title of a media asset), since the structure of webpages is often complicated and in many cases words that appear next to each other on the webpage do not appear nearby in the source code, leading to errors where the crawler returns incorrect data. The below systems and methods, by examining the structure ("path attributes") of the webpage, provide substantially increased accuracy of the data retrieved from websites.

For example, the media guidance application may use training data to automatically discover and establish a schema transformation or mapping between a set of webpages of a specific scheme and a desired target schema. The training data may comprise a set of web URLS or cached pages, where each webpage represents one terminal page of the website. For each webpage or URL, the metadata expected to be available on that webpage or URL is made available to the media guidance application. For example, for a movie known to be available on a webpage, the training data (metadata expected to be available) may include the title, release, year, cast, director, categories, duration, etc.

The media guidance application may divide the set of web page URLS and associated known metadata into two groups. The first group may be used as a training group and the other as test group. By collectively analyzing the training information for each page, the media guidance application may estimate the most efficient and/or accurate schema transformations or mappings that can be made. The analysis of multiple webpages gives a higher degree of certainty for a common path attribute (e.g., an Xpath) for each specific target schema element (e.g., a media descriptor type).

The most efficient schema transformations or mappings may make use of available clues in the web page, e.g., the media guidance application generated mapping may prefer id/class attributes of HTML elements, over their relative positions within the parent elements/or document structure. The media guidance application may use the estimated schema-transform on each of the webpage/URLs in the test group. The extracted information from this exercise is then compared by the media guidance application with known metadata elements to determine the effectiveness of the estimated schema-transform. In some embodiments, the media guidance application may perform multiple iterations by randomly dividing the training data into two sets to refine and weed out any bias or error in the estimated schema-transform.

It should be noted that the media guidance application may be applicable for any metadata domain, and the examples used below are in the context of entertainment metadata domain, such as movies, television shows, episodes, persons, etc. The media guidance application is agnostic to any specific addressing scheme to extract information from web pages, the examples use Xpath for illustration. Furthermore, the media guidance application is not limited to web "scraping" or "crawling" per se, it can also be applied to any HTML/XML/RSS or other structured documents available locally (i.e., not on the web).

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

FIG. 1 is a block diagram showing the automatic collection of data based on mapping schemes in accordance with some embodiments of the disclosure. A media guidance application may retrieve a first webpage 102 from a website which is associated with a first media asset. For example, first webpage 102 may be associated with the film "Seul sur Mars," and it may be part of the larger website "www.allocine.fr." In general, each website may contain any number of different webpages, each of which may be associated with a different media asset.

The media guidance application may then select, from a database of a plurality of verified media descriptors, a verified media descriptor for the first media asset, wherein each of the plurality of verified media descriptors is associated with one of a plurality of media descriptor types. For example, the media guidance application may retrieve high quality meta data 104 for the first media asset, and this high quality meta data 104 may contain verified media descriptors which are known to be true about the media asset. For example, high quality meta data 104 for the film "Seul sur Mars" may include verified information that the director (e.g., the media descriptor type) of the film is "Ridley Scott" (e.g., the verified media descriptor), the main actors are "Matt Damon" and "Kristen Wiig", and the release date was "21 octobre 2015." For some media assets, the same media descriptor may match multiple media descriptor types. For example, if a single person has written, directed, and acted in the movie, that person's name may be the media descriptor for the "Writer" "Director" and "Actor" media descriptor types. Each media descriptor is associated with a media descriptor type, which for a film may include the film's title, director, actors, ratings, a listing of other related films, and the like.

The media guidance application may match the verified media descriptor to a first media descriptor in the first webpage. For example, the media guidance application may match the selected verified media descriptor (e.g., "Matt Damon") to a first media descriptor in first webpage 102 with the same string of characters (e.g., "Matt Damon"). The media guidance application may parse the source code of the webpage to identify the location where the same characters as the verified media descriptor (e.g., "Matt Damon") appear (e.g., the first media descriptor). For example, the media guidance application may match the verified media descriptor "Ridley Scott," which may be associated with the "Director" media descriptor type, to text in the source code of first webpage 102 that also contains the string, "Ridley Scott." Although media descriptors are often text, in some embodiments media descriptors may contain other types of images, video, or multimedia. For example, one of the media descriptor types may be a "poster" for the movie, or a "theatrical trailer" for the movie. In this case, the media descriptors associated with each attribute may be an image or even a video clip with accompanying audio.

The media guidance application may analyze the first webpage to identify a first path attribute associated with the first media descriptor. For example, the media guidance application may analyze the source code of first webpage 102 near the location where the verified media descriptor was matched (e.g., the first media descriptor in the first webpage) for structural features of the source code (e.g., the first path attribute).

In some embodiments, the first path attribute includes a path and a format attribute, which is at least one of a location, a font, a size, or a color. For example, the format attribute may be any characteristic that distinguishes how the descriptor is presented that distinguishes from how other information is presented, while the path refers to the location in the directory structure. For example, one way of defining a location is by using the Xpath query language for XML documents, allowing for consistent retrieval of information from said documents.

In response to identifying the first path attribute associated with the first media descriptor, the media guidance application may associate the first media descriptor with the media descriptor type of the verified media descriptor. For example, the media guidance application may determine that the path attribute (e.g., location) of the media descriptor "Ridley Scott" on first webpage 102 is a location that may contain a media descriptor for the "Director" media descriptor type (based on the corresponding verified media descriptor having that descriptor type) for webpages on the website in general. The media guidance application may then access another webpage on the website associated with another media asset, and it may determine the media descriptor contained in that location is associated with the "Director" media descriptor type for the second media asset.

Similar comparisons may be used by the media guidance application as part of mapping generator 106 in order to determine a path attribute for locating a media descriptor for each of the media descriptor types. For example, the output of mapping generator 106 may be a set of path attributes (e.g., Xpaths 108) for extracting metadata from any webpage contained on the website. Each individual path attribute (e.g., Xpath 110) contains a mapping to a location within the website which contains a media descriptor for a given media descriptor type. For example, the media descriptor for the "Title" type for a given media asset may be located on a webpage associated with that media asset by using the Xpath "/doc/abc/xyz/@title." In some embodiments, the media guidance application may also use multiple webpages on a website and multiple sets of known meta data as inputs to mapping generator 106. This may increase the overall reliability and accuracy of the mapping for each of the individual Xpaths 110 contained in the set of Xpaths 108.

The media guidance application may then apply the set of Xpaths 108 to a retrieved second webpage 112 contained on the website which is associated with a second media asset. For example, the second webpage 112 may be associated with the film "Alien, le Huitième Passager." The media guidance application may retrieve the html document for the second webpage, and use each the identified path attribute (e.g., Xpath 110) in order to extract information about each of the media descriptor types for the media asset associated with the second webpage. For example, by using the Xpath "/doc/abc/xyz/@ryear," the media guidance application may retrieve the media descriptor "12, septembre 1978" and associate it with the media descriptor type "ReleaseDate." In general the media guidance application may apply the full set of path attributes (e.g., Xpaths 108) with the second webpage 112 in order to extract a full set of meta data 114 from the second webpage. This general technique may be used to extract any kind of data contained on the webpage, provided that webpages on the website always have similar types of descriptors placed in similar locations.

In some embodiments, the media guidance application determines how reliable each of the Xpaths 110 are by comparing the extracted meta data 114 to already verified or known meta data. For example, if high quality meta data 104 contains information about the film "Alien, le Huitième Passager," this may be compared to the extracted meta data 114 in order to determine the accuracy and reliability of each of the individual Xpaths 110 generated by the mapping generator.

In some embodiments, the media guidance application may also be given a plurality of websites, each of which is associated with a known media asset and a known set of verified metadata for each of the media assets. These websites may be divided into a training set and a testing set, and cross validation techniques may be applied by taking different training sets as inputs into mapping generator 106, and determining the reliability of the resulting set of Xpaths 108 by comparing the extracted meta data 114 for each website contained in the testing set with verified high quality meta data 104.

Figure 2:
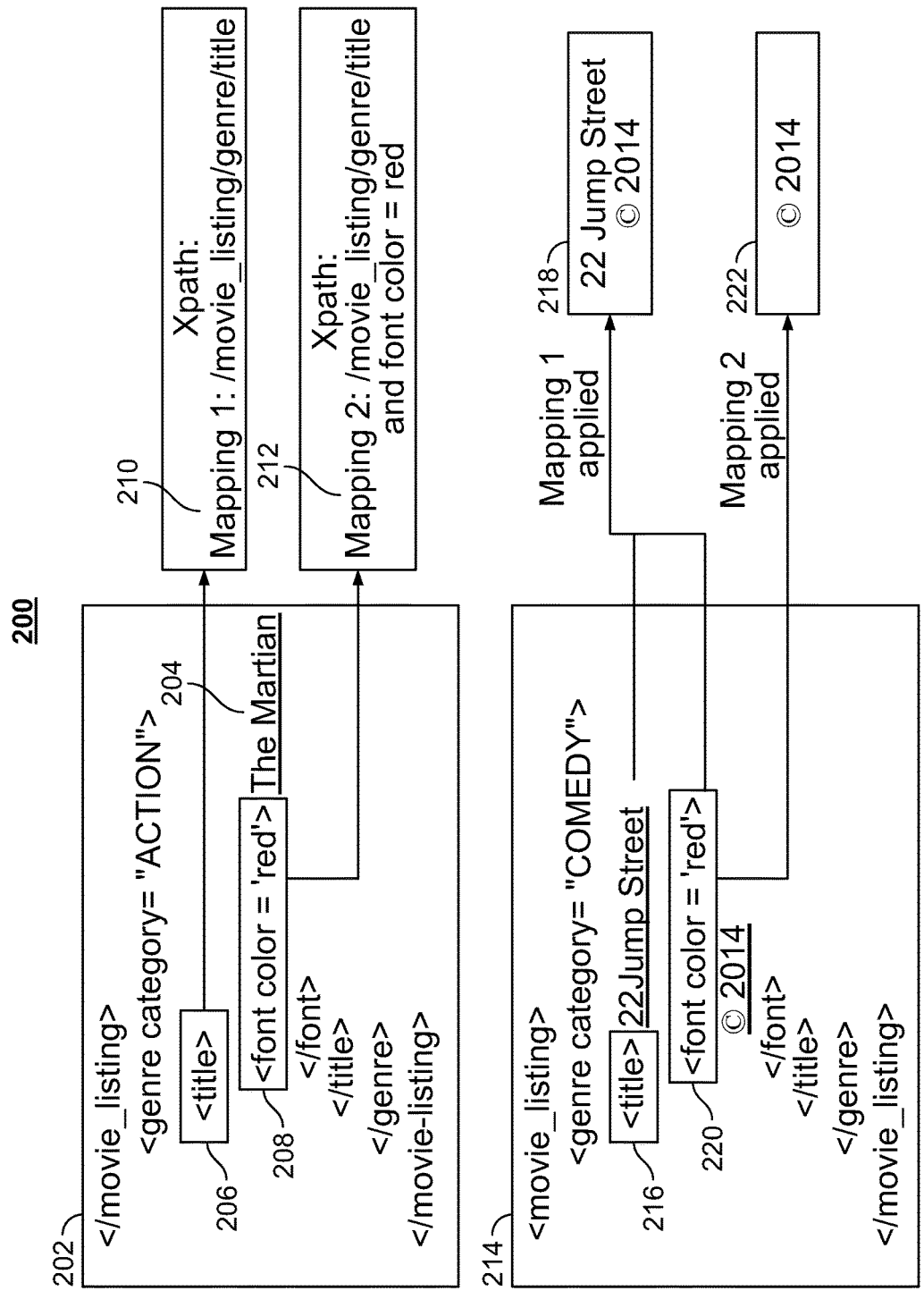
FIG. 2 is a diagram showing mappings generated by a mapping generator in accordance with some embodiments of the disclosure.

FIG. 2 is a diagram showing mappings generated by a mapping generator in accordance with some embodiments of the disclosure. The media guidance application may determine from verified high quality meta data 104 that title 204 "The Martian" (e.g., a media descriptor) determined on webpage 202 corresponds to the "actor" media descriptor type as outlined above in FIG. 1.

The media guidance application may then determine what path attribute(s) correspond to the media descriptor on the webpage, as outlined above in FIG. 1. For example, once the media guidance application determines that title 204 is associated with the "title" media descriptor type based on title 204 matching the "title" media descriptor type of a verified media descriptor, the media guidance application identifies path attributes in the source code of webpage 202. For example, the path attributes could be the Xpath, as indicated by title 204 being contained within structure tag 206 ("<title>"). Alternatively or additionally, the path attribute could be a format attribute of title 204, such as the color "red," as indicated by color tag 208.

As described above in FIG. 1, the media guidance application may generate mappings based on the associations of path attributes and media descriptor types. The media guidance application may generate code that indicates that the media descriptor associated with the first path attribute in any webpage of the website is associated with the media descriptor type. For example, the media guidance application may generate code for first mapping 210 and second mapping 212 that provides instructions to the media guidance application on what path attributes to query for when crawling webpages of a website. The mappings may include a single path attribute, as in first mapping 210 where the "title" media descriptor type maps to the Xpath "/movie_listing/genre/title." Alternatively, the mappings may include multiple path attributes, as in second mapping 212, where the "title" media descriptor type maps to the Xpath "/movie_listing/genre/title," as well as the font color being red.

In some embodiments, the media guidance application may select the path attribute for each mapping randomly from a plurality of path attributes associated with the first media descriptor. For example, the media guidance application may retrieve tags, code snippets, links, or any other feature of the source code of webpage 202 that are located near or are associated with the media descriptor of a certain media descriptor type from the source code. As described above, both structure tag 206 and color tag 208 are located near title 204 in the code and as such are retrieved by the media guidance application as path attributes corresponding to the media descriptor type "title."

The media guidance application may apply first mapping 210 to a second webpage, e.g., webpage 214. The media guidance application may then compare the second media descriptor in the database of learned media descriptors for the second media asset to a second verified media descriptor of the media descriptor type from a database of a plurality of verified media descriptors for the second media asset. For example, first mapping 210 associates the "title" media descriptor type with a particular Xpath described above. In this case, mapping 210 determines structure tag 216 corresponds to the Xpath associated with the "title" media descriptor type. The media guidance application may then retrieve the value contained at that Xpath. In this instance, the media guidance application retrieves title 218, "22 Jump Street ©2014." The media guidance application compares the retrieved second descriptor corresponding to the second media asset contained on the second webpage with high quality meta data, such as that described in FIG. 1. The verified title for the second media asset may be, "22 Jump Street." Thus, the media guidance application determines that title 218 matches the verified title, but also includes additional characters "©2014."

The media guidance application then may determine a first accuracy of the mapping based on the comparison. For example, since the retrieved second media descriptor (e.g., title 218) includes the second verified descriptor ("22 Jump Street"), but also includes additional characters, the media guidance application may determine the accuracy is 5 out of a possible 10. In some embodiments, the accuracy could be tied to the number of unmatched characters between the second media descriptor and the verified media descriptor.

In some embodiments, in the same manner as described in the previous paragraphs for first mapping 210, the media guidance application may determine an accuracy of second mapping 212. The media guidance application may determine color tag 220 corresponds to the path attributes outlined in the mapping and retrieves title 222, "©2014," from the source code of webpage 214. The media guidance application may compare the first accuracy to a second accuracy of a different mapping, wherein the different mapping maps a second path attribute to the media descriptor type. The second accuracy may be determined in the same manner as the first accuracy. For example, since the retrieved second media descriptor (e.g., title 222) does not include any portion of the second verified descriptor ("22 Jump Street"), the media guidance application may determine the accuracy is 0 out of a possible 10.

The media guidance application may then, in response to determining that the first accuracy is greater than the second accuracy, select the mapping for use in associating the second media descriptor with the media descriptor type. In the above example, since the first accuracy (e.g., 5) is greater than the second accuracy (e.g., 0), the media guidance application may determine first mapping 210 is a more accurate mapping than second mapping 212. In response, the media guidance application may select first mapping 210 for use in associating metadata on webpages with the "title" media descriptor type.

Figure 3:
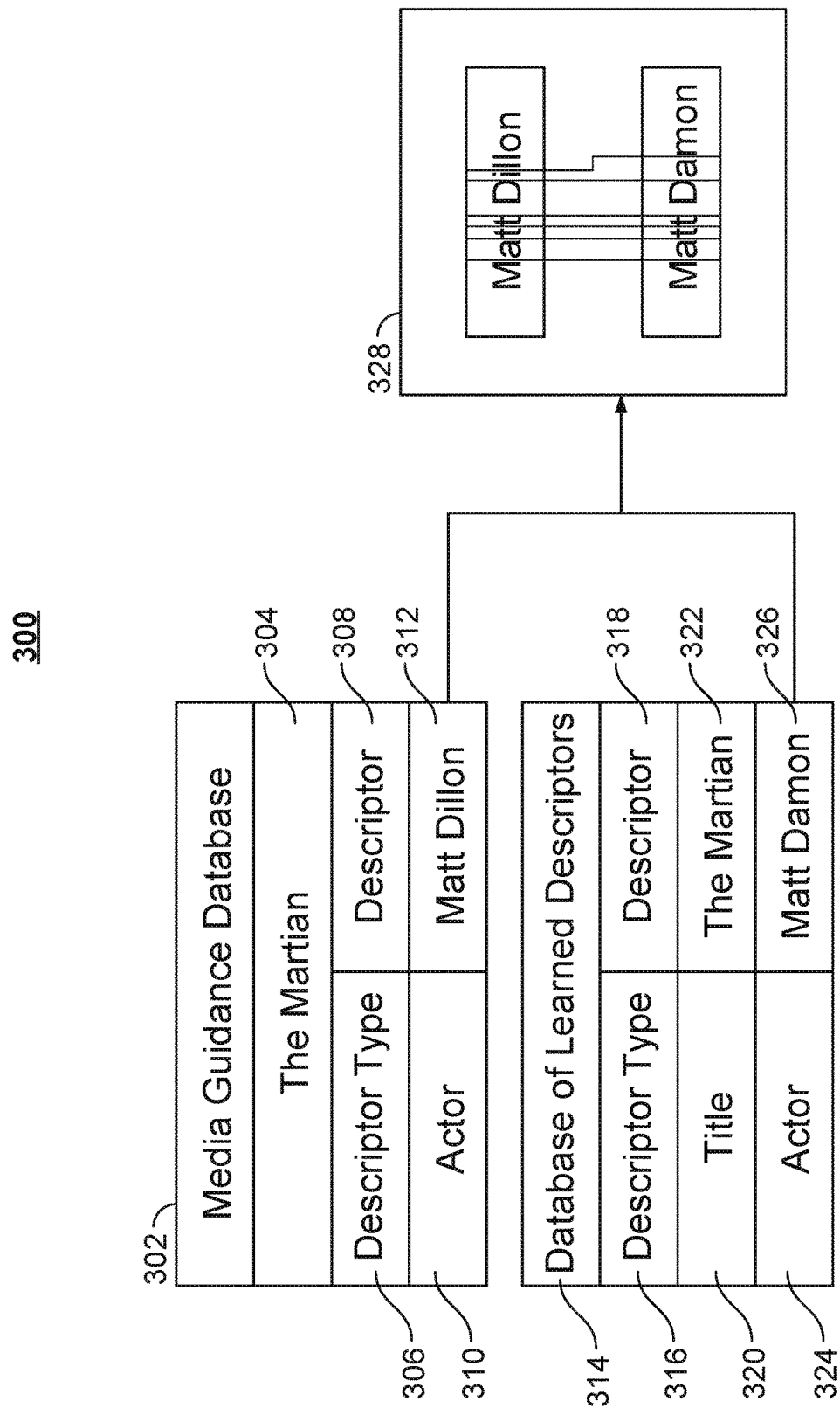
FIG. 3 is a diagram showing validation of media descriptors in accordance with some embodiments of the disclosure.

FIG. 3 is a diagram showing validation of media descriptors in accordance with some embodiments of the disclosure. In some embodiments, the media guidance application may access a media guidance database containing metadata used to generate media asset listings in an electronic program guide. For example, the media guidance application may access media guidance database 302 stored either locally in memory (e.g., storage as described in FIG. 6) on a user equipment device (e.g., user equipment devices 702, 704, and/or 706 (FIG. 7) below) or remotely at a media guidance data source accessible via a communications network, (e.g., as described in FIG. 7 below).

Media guidance database 302 may contain listings of programs in tables with corresponding metadata in fields of the tables, or as objects of a program listing class with variables instantiated based on the metadata for the program. For instance, media guidance database 302 contains a header 304 corresponding to the title of a media asset. In some embodiments, the header could be empty or a placeholder that does not contain a media descriptor or media descriptor type. Media guidance database 302 contains a list of media descriptors 308 and their associated media descriptor types 306. For instance, media descriptor 312 "Matt Dillon" corresponds to media descriptor type 310, "actor."

The media guidance application can access a database of learned descriptors, as described above in FIGS. 1-2, where based on a mapping between path attributes and media descriptor types, media descriptors can be stored in memory associated with the applicable media descriptor type. For example, the media guidance application may access database of learned media descriptors 314 stored either locally in memory (e.g., storage as described in FIG. 6) on a user equipment device (e.g., user equipment devices 702, 704, and/or 706 (FIG. 7) below) or remotely at a media guidance data source accessible via a communications network, (e.g., as described in FIG. 7 below).

Media guidance database 302 may contain listings of programs in tables with corresponding metadata in fields of the tables, or as objects of a program listing class with variables instantiated based on the metadata for the program. For instance, media guidance database 302 contains a list of media descriptors 318 and their associated media descriptor types 316. As an example, title 322 "The Martian" corresponds to media descriptor type 320, "title." As another example, media descriptor 326 "Matt Damon" corresponds to media descriptor type 324, "actor."

Figure 4:
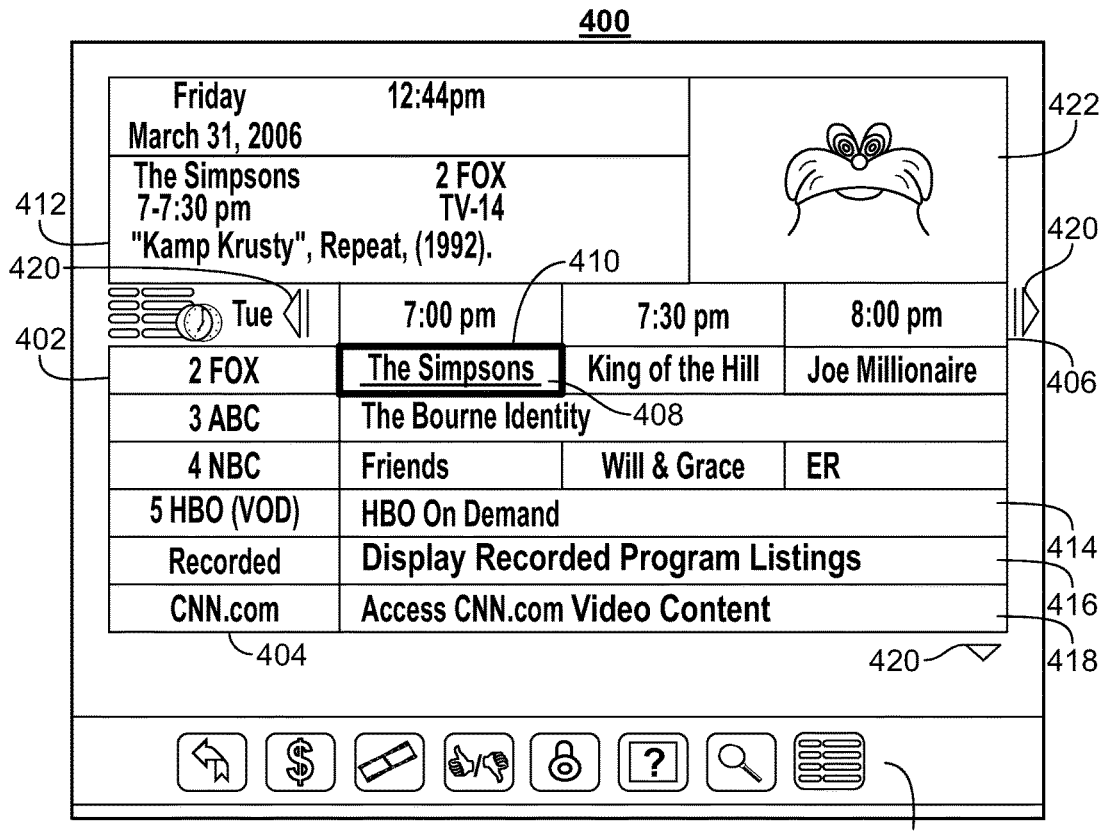
FIG. 4 shows an illustrative example of a media guidance display for navigating and selecting media assets in accordance with some embodiments of the disclosure.
Figure 5:
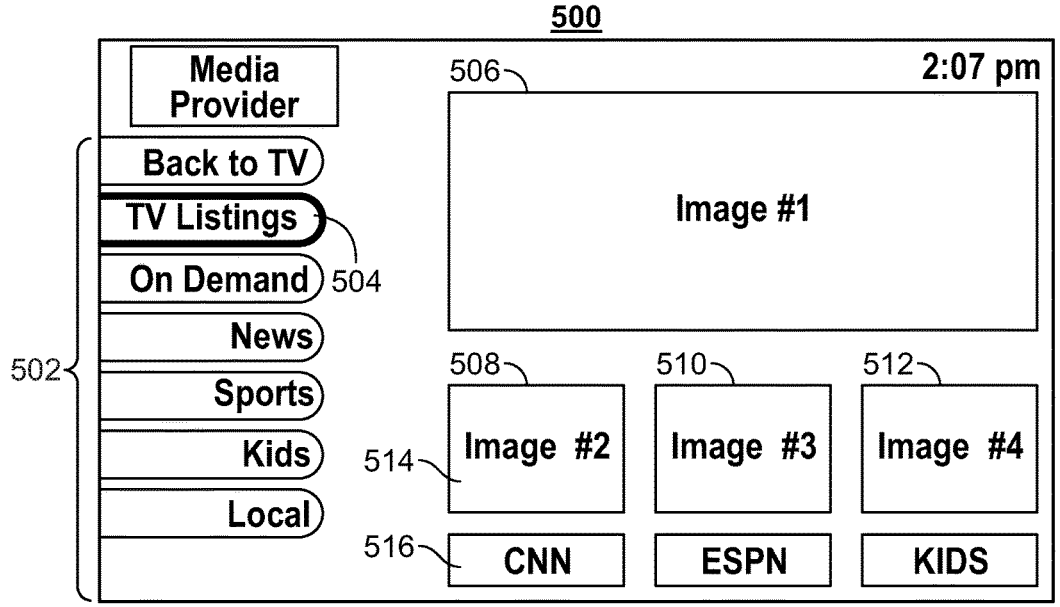
FIG. 5 shows another illustrative example of a media guidance display for navigating and selecting media assets in accordance with some embodiments of the disclosure.

The media guidance application may compare entries in the media guidance database with the database of learned descriptors. For example, the media guidance application may compare an entry for the movie, "The Martian" and its associated metadata (e.g., the name of an actor in the movie) stored in media guidance database 302 with an entry also for "The Martian" stored in database of learned media descriptors 314 (e.g., metadata crawled from a particular webpage). In order to determine the two entries correspond, i.e., they are for the same media asset, the media guidance application may compare the titles, actors, or additional metadata stored in fields of the entries. Once the media guidance application determines the entries match (e.g., since header 304 matches title 322), the media guidance application may compare metadata stored in the media guidance database 302 and database of learned media descriptors 314 with the goal of validating the data in media guidance database 302, which may be used to populate program listings in an electronic program guide, as shown in FIGS. 4-5 below.

The media guidance application may then determine a first field in the media guidance database corresponding to the second media asset and a second field in the database of learned descriptors corresponding to the second media asset are different. For example, the media guidance application may determine media guidance database 302 lists media descriptor 312 "Matt Dillon" as media descriptor type 310 "actor" in "The Martian," while database of learned media descriptors 314 lists media descriptor 326 "Matt Damon" as media descriptor type 324 "actor" in "The Martian." The media guidance application may then determine that the two actor fields are different, as they contain different characters, based on comparison 328 of media descriptor 326 and media descriptor 312.

In some embodiments, the media guidance application may retrieve a first stored descriptor from the first field. For example, the media guidance application may retrieve the first stored descriptor by executing a database query language script, such as SQL, and utilizing the declarative "Select" command to access data in a particular table or expression. The media guidance application may retrieve a first stored descriptor, (e.g., media descriptor 312 "Matt Dillon" from media guidance database 302). The media guidance application may retrieve a second stored descriptor from the second field. For example, the media guidance application may retrieve the second stored descriptor from the second field by executing a database query language script such as SQL, and utilizing the declarative "Select" command to access data in a particular table or expression. The media guidance application may retrieve a second stored descriptor (e.g., media descriptor 326 "Matt Damon" from database of learned media descriptors 314). The media guidance application may then compare corresponding characters of the first stored descriptor with those of the second stored descriptor. For example, the media guidance application may execute a script (e.g., to facilitate comparison 328) to parse through the retrieved descriptors by returning individual characters corresponding to indices in the string and comparing like indices. As an example, assuming skipping of white space, index [6] would return a first character "i" for media descriptor 312 and a second character "a" for media descriptor 326.

The media guidance application may determine the first character does not correspond to the second character by comparing the ASCII codes or any other method of comparing two characters. The media guidance application may, in response to the first character of the first stored descriptor not corresponding to the second character of the second stored descriptor, determine the first entry and the second entry are different. For example, as described above, if the media guidance application determines any of the characters at a particular index do not match between media descriptor 312 and media descriptor 326, the media guidance application may determine that media descriptor 312 and media descriptor 326 are different.

The media guidance application may, in response to the determining, update the first field in the media guidance database to match the second field in the database of learned descriptors. For example, after determining that "Matt Dillon" (e.g., media descriptor 312) stored in a field in media guidance database 302 does not match "Matt Damon" (e.g., media descriptor 326) stored in a field in database containing learned media descriptors 314, the media guidance application may update media guidance database 302 to reflect the field stored in database containing learned media descriptors 314 (e.g., to "Matt Damon" from "Matt Dillon").

FIGS. 4-5 show illustrative display screens that may be used to provide media guidance data. The display screens shown in FIGS. 4-5 may be implemented on any suitable user equipment device or platform. While the displays of FIGS. 4-5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 4 shows illustrative grid of a program listings display 400 arranged by time and channel that also enables access to different types of content in a single display. Display 400 may include grid 402 with: (1) a column of channel/content type identifiers 404, where each channel/content type identifier (which is a cell in the column) identifies a different channel or content type available; and (2) a row of time identifiers 406, where each time identifier (which is a cell in the row) identifies a time block of programming. Grid 402 also includes cells of program listings, such as program listing 408, where each listing provides the title of the program provided on the listings associated channel and time. With a user input device, a user can select program listings by moving highlight region 410. Information relating to the program listing selected by highlight region 410 may be provided in program information region 412. Region 412 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 402 may provide media guidance data for non-linear programming including on-demand listing 414, recorded content listing 416, and Internet content listing 418. A display combining media guidance data for content from different types of content sources is sometimes referred to as a "mixed-media" display. Various permutations of the types of media guidance data that may be displayed that are different than display 400 may be based on user selection or guidance application definition (e.g., a display of only recorded and broadcast listings, only on-demand and broadcast listings, etc.). As illustrated, listings 414, 416, and 418 are shown as spanning the entire time block displayed in grid 402 to indicate that selection of these listings may provide access to a display dedicated to on-demand listings, recorded listings, or Internet listings, respectively. In some embodiments, listings for these content types may be included directly in grid 402. Additional media guidance data may be displayed in response to the user selecting one of the navigational icons 420. (Pressing an arrow key on a user input device may affect the display in a similar manner as selecting navigational icons 420.)

Display 400 may also include video region 422, and options region 426. Video region 422 may allow the user to view and/or preview programs that are currently available, will be available, or were available to the user. The content of video region 422 may correspond to, or be independent from, one of the listings displayed in grid 402. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 426 may allow the user to access different types of content, media guidance application displays, and/or media guidance application features. Options region 426 may be part of display 400 (and other display screens described herein), or may be invoked by a user by selecting an on-screen option or pressing a dedicated or assignable button on a user input device. The selectable options within options region 426 may concern features related to program listings in grid 402 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 7. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 5. Video mosaic display 500 includes selectable options 502 for content information organized based on content type, genre, and/or other organization criteria. In display 500, television listings option 504 is selected, thus providing listings 506, 508, 510, and 512 as broadcast program listings. In display 500 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 508 may include more than one portion, including media portion 514 and text portion 516. Media portion 514 and/or text portion 516 may be selectable to view content in full-screen or to view information related to the content displayed in media portion 514 (e.g., to view listings for the channel that the video is displayed on).

The listings in display 500 are of different sizes (i.e., listing 506 is larger than listings 508, 510, and 512), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 6:
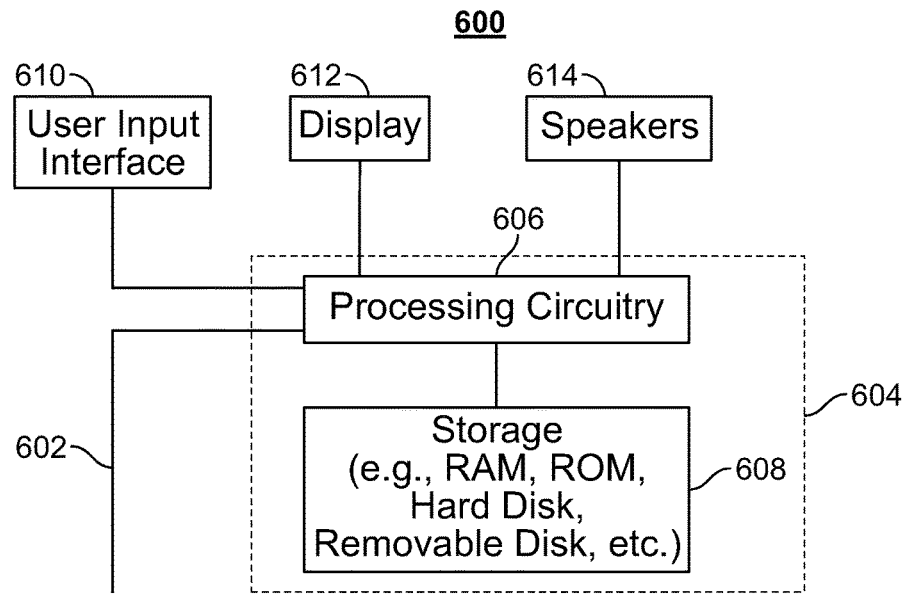
FIG. 6 is a block diagram of an illustrative user equipment device in accordance with some embodiments of the disclosure.

Users may access content and the media guidance application (and its display screens described above and below) from one or more of their user equipment devices. FIG. 6 shows a generalized embodiment of illustrative user equipment device 600. More specific implementations of user equipment devices are discussed below in connection with FIG. 7. User equipment device 600 may receive content and data via input/output (hereinafter "I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media guidance application stored in memory (i.e., storage 608). Specifically, control circuitry 604 may be instructed by the media guidance application to perform the functions discussed above and below. For example, the media guidance application may provide instructions to control circuitry 604 to generate the media guidance displays. In some implementations, any action performed by control circuitry 604 may be based on instructions received from the media guidance application.

In client-server based embodiments, control circuitry 604 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 7). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media guidance data described above. Nonvolatile memory may also be used (e.g., to launch a boot-up routine and other instructions). Cloud-based storage, described in relation to FIG. 7, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of the user equipment 600. Circuitry 604 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of user equipment device 600. For example, display 612 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 612 may be HDTV-capable. In some embodiments, display 612 may be a 3D display, and the interactive media guidance application and any suitable content may be displayed in 3D. A video card or graphics card may generate the output to the display 612. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 604. The video card may be integrated with the control circuitry 604. Speakers 614 may be provided as integrated with other elements of user equipment device 600 or may be stand-alone units. The audio component of videos and other content displayed on display 612 may be played through speakers 614. In some embodiments, the audio may be distributed to a receiver (not shown), which processes and outputs the audio via speakers 614.

The guidance application may be implemented using any suitable architecture. For example, it may be a stand-alone application wholly-implemented on user equipment device 600. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected.

In some embodiments, the media guidance application is a client-server based application. Data for use by a thick or thin client implemented on user equipment device 600 is retrieved on-demand by issuing requests to a server remote to the user equipment device 600. In one example of a client-server based guidance application, control circuitry 604 runs a web browser that interprets web pages provided by a remote server. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on equipment device 600. This way, the processing of the instructions is performed remotely by the server while the resulting displays are provided locally on equipment device 600. Equipment device 600 may receive inputs from the user via input interface 610 and transmit those inputs to the remote server for processing and generating the corresponding displays. For example, equipment device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to equipment device 600 for presentation to the user.

In some embodiments, the media guidance application is downloaded and interpreted or otherwise run by an interpreter or virtual machine (run by control circuitry 604). In some embodiments, the guidance application may be encoded in the ETV Binary Interchange Format (EBIF), received by control circuitry 604 as part of a suitable feed, and interpreted by a user agent running on control circuitry 604. For example, the guidance application may be an EBIF application. In some embodiments, the guidance application may be defined by a series of JAVA-based files that are received and run by a local virtual machine or other suitable middleware executed by control circuitry 604. In some of such embodiments (e.g., those employing MPEG-2 or other digital media encoding schemes), the guidance application may be, for example, encoded and transmitted in an MPEG-2 object carousel with the MPEG audio and video packets of a program.

Figure 7:
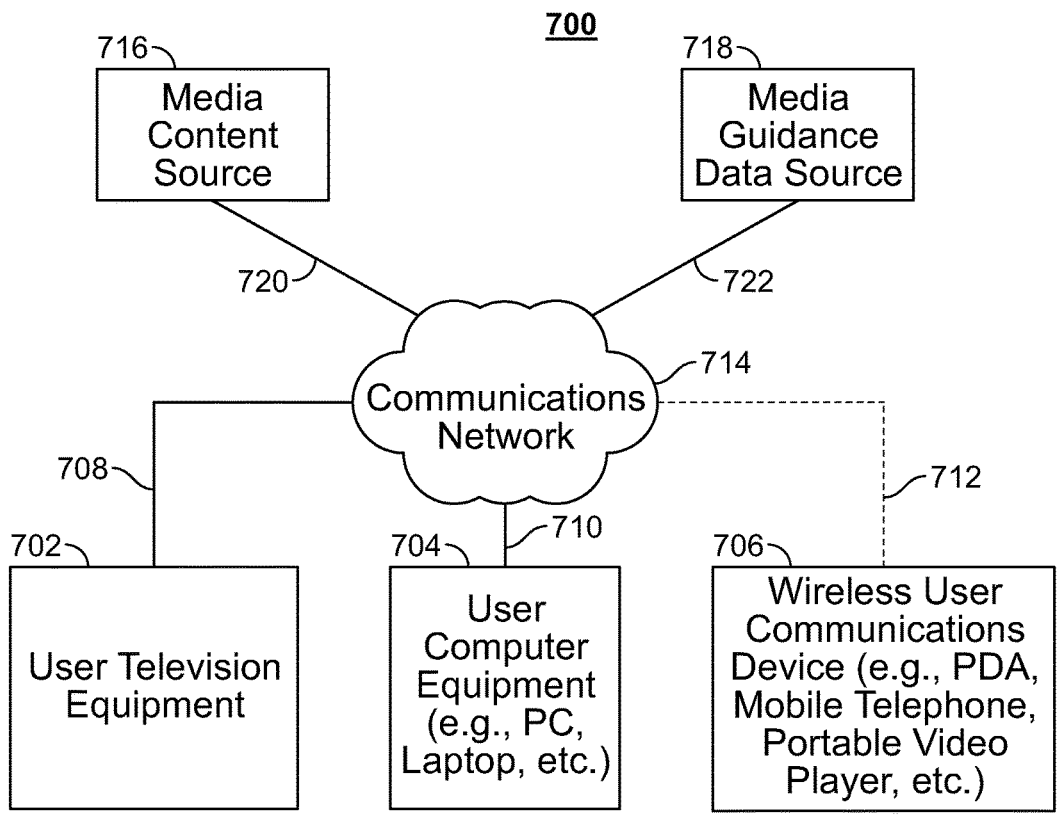
FIG. 7 is a block diagram of an illustrative media system in accordance with some embodiments of the disclosure.

User equipment device 600 of FIG. 6 can be implemented in system 700 of FIG. 7 as user television equipment 702, user computer equipment 704, wireless user communications device 706, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 6 may not be classified solely as user television equipment 702, user computer equipment 704, or a wireless user communications device 706. For example, user television equipment 702 may, like some user computer equipment 704, be Internet-enabled allowing for access to Internet content, while user computer equipment 704 may, like some television equipment 702, include a tuner allowing for access to television programming. The media guidance application may have the same layout on various different types of user equipment or may be tailored to the display capabilities of the user equipment. For example, on user computer equipment 704, the guidance application may be provided as a web site accessed by a web browser. In another example, the guidance application may be scaled down for wireless user communications devices 706.

In system 700, there is typically more than one of each type of user equipment device but only one of each is shown in FIG. 7 to avoid overcomplicating the drawing. In addition, each user may utilize more than one type of user equipment device and also more than one of each type of user equipment device.

In some embodiments, a user equipment device (e.g., user television equipment 702, user computer equipment 704, wireless user communications device 706) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 714. Namely, user television equipment 702, user computer equipment 704, and wireless user communications device 706 are coupled to communications network 714 via communications paths 708, 710, and 712, respectively. Communications network 714 may be one or more networks including the Internet, a mobile phone network, mobile voice or data network (e.g., a 4G or LIB network), cable network, public switched telephone network, or other types of communications network or combinations of communications networks. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 712 is drawn with dotted lines to indicate that in the exemplary embodiment shown in FIG. 7 it is a wireless path and paths 708 and 710 are drawn as solid lines to indicate they are wired paths (although these paths may be wireless paths, if desired). Communications with the user equipment devices may be provided by one or more of these communications paths, but are shown as a single path in FIG. 7 to avoid overcomplicating the drawing.

Although communications paths are not drawn between user equipment devices, these devices may communicate directly with each other via communication paths, such as those described above in connection with paths 708, 710, and 712, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 714.

System 700 includes content source 716 and media guidance data source 718 coupled to communications network 714 via communication paths 720 and 722, respectively. Paths 720 and 722 may include any of the communication paths described above in connection with paths 708, 710, and 712. Communications with the content source 716 and media guidance data source 718 may be exchanged over one or more communications paths, but are shown as a single path in FIG. 7 to avoid overcomplicating the drawing. In addition, there may be more than one of each of content source 716 and media guidance data source 718, but only one of each is shown in FIG. 7 to avoid overcomplicating the drawing. (The different types of each of these sources are discussed below.) If desired, content source 716 and media guidance data source 718 may be integrated as one source device. Although communications between sources 716 and 718 with user equipment devices 702, 704, and 706 are shown as through communications network 714, in some embodiments, sources 716 and 718 may communicate directly with user equipment devices 702, 704, and 706 via communication paths (not shown) such as those described above in connection with paths 708, 710, and 712.

Content source 716 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 716 may be the originator of content (e.g., a television broadcaster, a Webcast provider, etc.) or may not be the originator of content (e.g., an on-demand content provider, an Internet provider of content of broadcast programs for downloading, etc.). Content source 716 may include cable sources, satellite providers, on-demand providers, Internet providers, over-the-top content providers, or other providers of content. Content source 716 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 718 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 718 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 718 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 718 may provide user equipment devices 702, 704, and 706 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 608, and executed by control circuitry 604 of a user equipment device 600. In some embodiments, media guidance applications may be client-server applications where only a client application resides on the user equipment device, and server application resides on a remote server. For example, media guidance applications may be implemented partially as a client application on control circuitry 604 of user equipment device 600 and partially on a remote server as a server application (e.g., media guidance data source 718) running on control circuitry of the remote server. When executed by control circuitry of the remote server (such as media guidance data source 718), the media guidance application may instruct the control circuitry to generate the guidance application displays and transmit the generated displays to the user equipment devices. The server application may instruct the control circuitry of the media guidance data source 718 to transmit data for storage on the user equipment. The client application may instruct control circuitry of the receiving user equipment to generate the guidance application displays.

Content and/or media guidance data delivered to user equipment devices 702, 704, and 706 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 700 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 7.

In one approach, user equipment devices may communicate with each other within a home network. User equipment devices can communicate with each other directly via short-range point-to-point communication schemes described above, via indirect paths through a hub or other similar device provided on a home network, or via communications network 714. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 716 to access content. Specifically, within a home, users of user television equipment 702 and user computer equipment 704 may access the media guidance application to navigate among and locate desirable content. Users may also access the media guidance application outside of the home using wireless user communications devices 706 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 714. These cloud resources may include one or more content sources 716 and one or more media guidance data sources 718. In addition or in the alternative, the remote computing sites may include other user equipment devices, such as user television equipment 702, user computer equipment 704, and wireless user communications device 706. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 704 or wireless user communications device 706 having content capture feature. Alternatively, the user can first transfer the content to a user equipment device, such as user computer equipment 704. The user equipment device storing the content uploads the content to the cloud using a data transmission service or communications network 714. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 6.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 8:
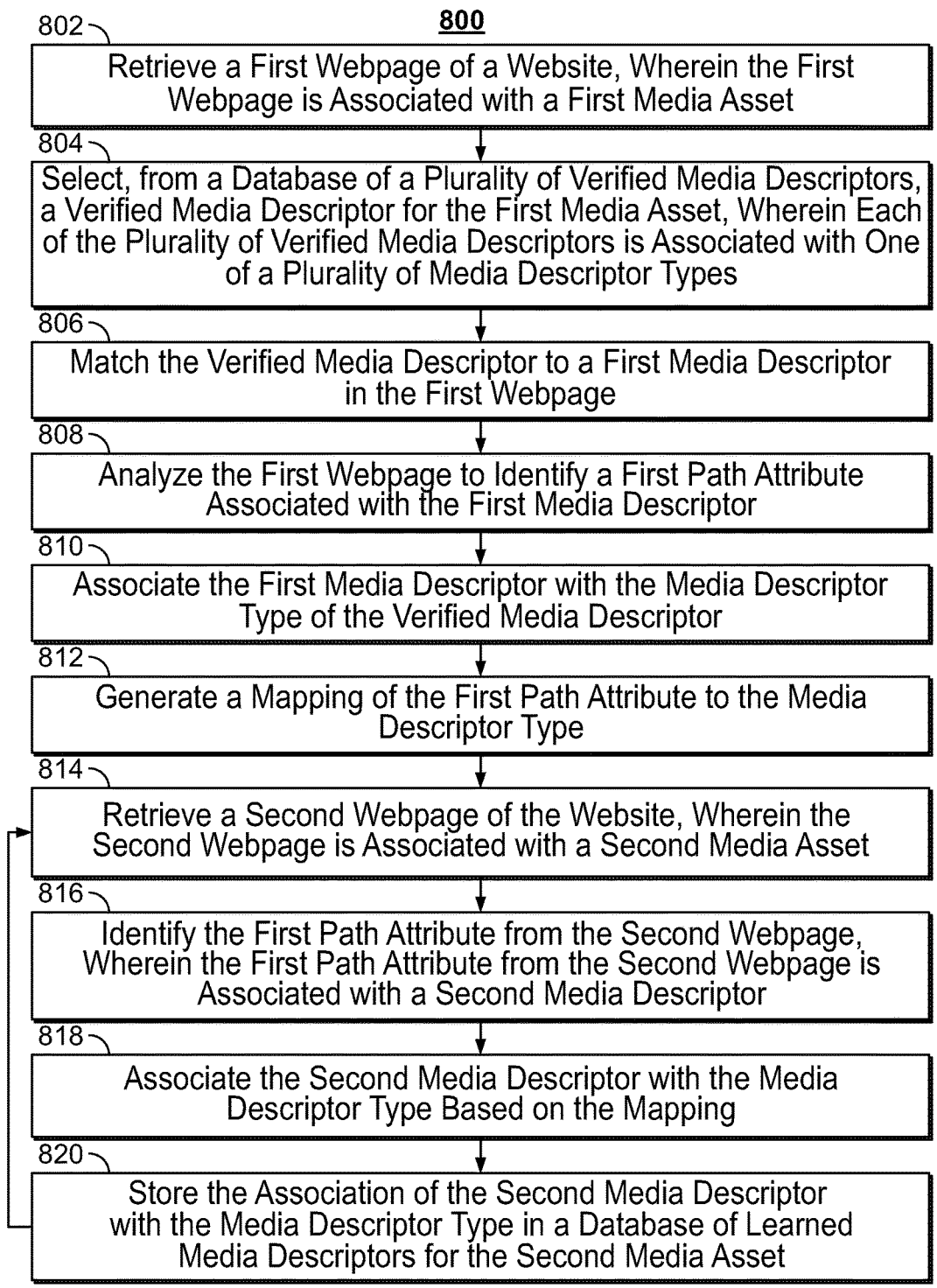
FIG. 8 is a flowchart of illustrative steps for automatically aggregating data from a webpage using a path attribute, in accordance with some embodiments of the disclosure.

FIG. 8 is a flowchart of illustrative steps for automatically aggregating data from a webpage using a path attribute, in accordance with some embodiments of the disclosure. For example, a media guidance application implementing process 800 may be executed by control circuitry 604 (FIG. 6). Process 800 begins at 802, where control circuitry 604 retrieves a first webpage of a website, wherein the first webpage is associated with a first media asset. For example, a webpage (e.g., webpage 102) may be associated with the film "Seul sur Mars," and it may be part of the larger website "www.allocine.fr." Control circuitry 604 may retrieve the webpage by accessing the webpage via the Internet or from a pre-downloaded cache. In general, each website may contain any number of different webpages, each of which may be associated with a different media asset.

Process 800 continues to 804, where control circuitry 604 selects, from a database of a plurality of verified media descriptors, a verified media descriptor for the first media asset, wherein each of the plurality of verified media descriptors is associated with one of a plurality of media descriptor types. The verified media descriptor may refer to a known or "true" value of a particular media descriptor for the media asset. In some embodiments, a media descriptor may be a name of a genre, a director, a title, a release date, an actor, a producer, a subject matter, or a graphic associated with a media asset. Additionally or alternatively, the media descriptor may be any value (e.g., word, number, alphanumeric character string, etc.) that relates to information to be collected and/or categorized. For example, control circuitry 604 may select a verified media descriptor for the name of an actor (e.g., Matt Damon) starring in the first media asset (e.g., "The Martian") from a database containing a plurality of verified media descriptors associated with "The Martian."

Process 800 continues to 806, where control circuitry 604 matches the verified media descriptor to a first media descriptor in the first webpage. For example, control circuitry 604 may retrieve verified media descriptors (e.g., high quality meta data 104) for the first media asset. For example, verified media descriptors (e.g., high quality meta data 104) for the film "Seul sur Mars" may include verified information that the director (e.g., the media descriptor type) of the film is "Ridley Scott" (e.g., the media descriptor), the main actors are "Matt Damon" and "Kristen Wiig", and the release date was "21 octobre 2015." For some media assets, the same media descriptor may match multiple media descriptor types. For example, if a single person has written, directed, and acted in the movie, that person's name may be the media descriptor for the "Writer" "Director" and "Actor" media descriptor types. Control circuitry 604 may retrieve the verified media descriptors from a database stored either locally in memory (e.g., storage as described in FIG. 6) on a user equipment device (e.g., user equipment devices 702, 704, and/or 706) or remotely at a media guidance data source accessible via a communications network, (e.g., as described in FIG. 7). Control circuitry 604 then parses the source code of the first webpage (e.g., webpage 102) to identify the location where the same characters as the verified media descriptor (e.g., "Matt Damon") appear (e.g., the first media descriptor).

Process 800 continues to 808, where control circuitry 604 analyzes the first webpage to identify a first path attribute associated with the first media descriptor. For example, control circuitry 604 may analyze the source code of the first webpage (e.g., webpage 102) near the location where the verified media descriptor was matched (e.g., the first media descriptor in the first webpage) for structural features of the source code (e.g., the first path attribute), as described further below in FIG. 9.

Process 800 continues to 810, where control circuitry 604 associates the first media descriptor with the media descriptor type of the verified media descriptor. For example, after identifying the verified media descriptor on the first webpage (e.g., identifying the first media descriptor is the same as the verified media descriptor), control circuitry 604 may determine the media descriptor type of the first media descriptor. For instance, the verified media descriptor may be of media descriptor type "director." In this case, control circuitry 604 would associate the identified media descriptor with the type "director."

Process 800 continues to 812, where control circuitry 604 generates a mapping of the first path attribute to the media descriptor type. For example, control circuitry 604 may determine that the path attribute (e.g., structure tag 206 and/or color tag 208) of the media descriptor (e.g., title 204 "The Martian") on a webpage (e.g., webpage 102 or 202) refers to an identifier indicating the presence of a media descriptor for the media descriptor type (e.g., "title," "director," etc.) for webpages on the website in general. Control circuitry 604 may then access another webpage on the website associated with another media asset, and it may determine the media descriptor contained in that location is associated with the same media descriptor type (e.g., "title," "director," etc.) for the second media asset.

Similar comparisons may be used by control circuitry 604 as part of a mapping generator (e.g., mapping generator 106) in order to determine a path attribute for locating a media descriptor for each of the media descriptor types. For example, the output of mapping generator 106 may be a set of Xpaths 108 for extracting metadata from any webpage contained on the website. Each individual Xpath 110 contains a mapping to a location within the website which contains a media descriptor for a given media descriptor type. For example, the media descriptor for the "Title" type for a given media asset may be located on a webpage associated with that media asset by using the Xpath "/doc/abc/xyz/@title." In some embodiments, control circuitry 604 may also use multiple webpages on a website and multiple sets of known meta data as inputs to mapping generator 106. This may increase the overall reliability and accuracy of the mapping for each of the individual Xpaths 110 contained in the set of Xpaths 108. The process of generating a mapping is outlined further below in FIG. 10.

Process 800 continues to 814, where control circuitry 604 retrieves a second webpage of the website, wherein the second webpage is associated with a second media asset. Control circuitry 604 may retrieve a second webpage in the same manner as described above when discussing retrieving a first webpage. For example, the second webpage 112 retrieved by control circuitry 604 may be associated with the film "Alien, le Huitième Passager."

Process 800 continues to 816, where control circuitry 604 identifies the first path attribute from the second webpage, where the first path attribute of the second webpage is associated with a second media descriptor. For example, control circuitry 604 may retrieve the html document for the second webpage, and use each the identified path attribute (e.g., Xpath 110) in order to extract information about each of the media descriptor types for the media asset associated with the second webpage. For example, by using the Xpath "/doc/abc/xyz/@ryear," control circuitry 604 may retrieve the media descriptor "12, septembre 1978." The process of identifying the first path attribute on the second webpage is outlined further below in FIG. 11.

Process 800 continues to 818, where control circuitry 604 associates the second media descriptor with the media descriptor type based on the mapping. For example, by using the Xpath "/doc/abc/xyz/@ryear," control circuitry 604 may retrieve the media descriptor "12, septembre 1978" and associate it with the media descriptor type "ReleaseDate."

Process 800 continues to 820, where control circuitry 604 stores the association of the second media descriptor with the media descriptor type in a database of learned media descriptors for the second media asset. For example, control circuitry 604 may maintain a database with all the media descriptors crawled from webpages using the mapping. In general control circuitry 604 may apply the full set of path attributes (e.g., Xpaths 108) with the second webpage (e.g., webpage 112) in order to extract a full set of media descriptors (e.g., meta data 114) from the second webpage. This general technique may be used to extract any kind of data contained on the webpage, provided that webpages on the website always have similar types of descriptors placed in similar locations.

Process 800 may return to 814 where control circuitry 604 retrieves another webpage of the website and apply the mapping to determine media descriptors corresponding to media descriptor types. In this way, control circuitry 604 may crawl every webpage of a website for media descriptors of particular types based on mappings determined using the verified media descriptors and types.

Figure 9:
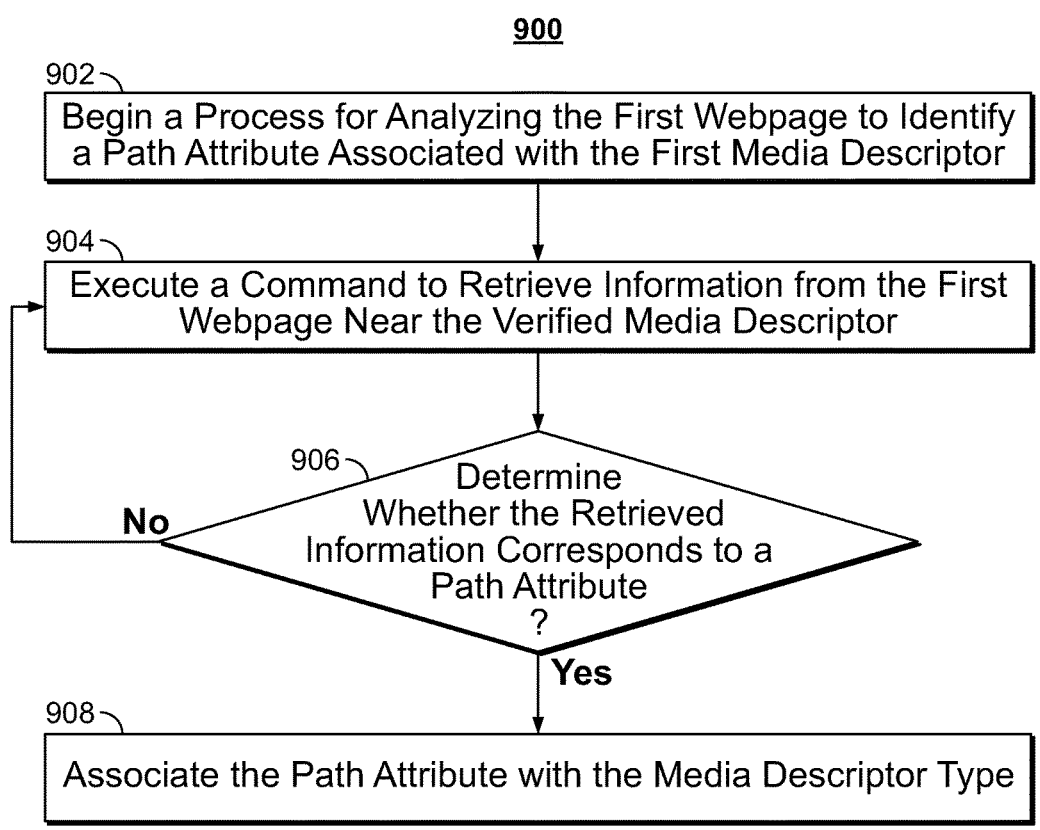
FIG. 9 is a flowchart of illustrative steps for identifying a path attribute, in accordance with some embodiments of the disclosure.

FIG. 9 is a flowchart of illustrative steps for identifying a path attribute, in accordance with some embodiments of the disclosure. For example, a media guidance application implementing process 900 may be executed by control circuitry 604 (FIG. 6). Process 900 begins at 902, where control circuitry 604 begins a process for analyzing the first webpage to identify a path attribute associated with the first media descriptor.

Process 900 continues to 904, where control circuitry 604 executes a command to retrieve information from the first webpage near the verified media descriptor. For example, control circuitry 604 may execute a script that includes instructions to query a webpage for a specific string of characters known to relate to the structure of webpages, for example "<header>" and return an expression containing those characters. Alternatively or additionally, control circuitry 604 may retrieve a segment of text or source code of a webpage and subdivide, either by rules or randomly, the segment into sub-segments. Control circuitry 604 may then analyze the sub-segments individually and determine whether each sub-segment corresponds to a path attribute. If no sub-segments are found to correspond to a path attribute, control circuitry 604 may subdivide the segment differently until a sub-segment is found to correspond to a path attribute, as described in more detail below.

Process 900 continues to 906, where control circuitry 604 determines whether the retrieved information corresponds to a path attribute. For example, control circuitry 604 may compare a retrieved string, (e.g., "<header>" with common path attributes to determine if the retrieved string corresponds to a path attribute.

If control circuitry 604 determines the retrieved information does not correspond to a path attribute, process 900 returns to 904, where control circuitry 604 executes a command to retrieve information from the first webpage near the verified media descriptor. For example, control circuitry 604 may retrieve information that is not related to a path attribute, such as a comment in the source code. Control circuitry 604 may determine that this information is not relevant (e.g., based on a comparison with common path attributes) and execute a command to retrieve another piece of information from the webpage near the verified media descriptor.

If control circuitry 604 determines the retrieved information corresponds to a path attribute, process 900 continues to 908, where control circuitry 604 associates the first path attribute with the media descriptor type. For example, control circuitry 604 may execute a command to associate a tag (e.g., structure tag 206) that immediately precedes the media descriptor in the code (e.g., the path attribute) with the media descriptor type (e.g., actor).

Figure 10:
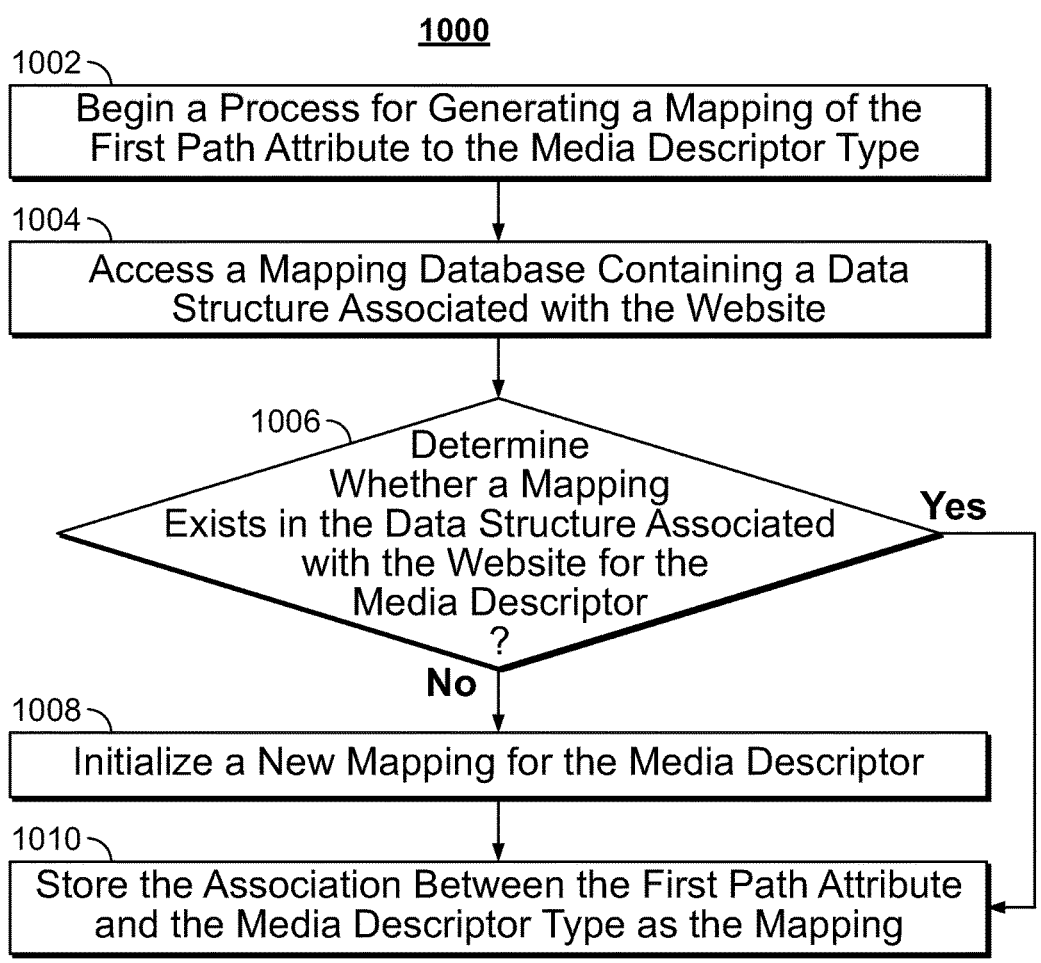
FIG. 10 is a flowchart of illustrative steps for generating a mapping, in accordance with some embodiments of the disclosure.

FIG. 10 is a flowchart of illustrative steps for generating a mapping, in accordance with some embodiments of the disclosure. For example, a media guidance application implementing process 1000 may be executed by control circuitry 604 (FIG. 6). Process 1000 begins at 1002, where control circuitry 604 begins a process for generating a mapping of the first path attribute to the media descriptor type.

Process 1000 continues to 1004, where control circuitry 604 accesses a mapping database containing a data structure associated with the website. For example control circuitry 604 may access the mapping database stored either locally in memory (e.g., storage as described in FIG. 6) on a user equipment device (e.g., user equipment devices 702, 704, and/or 706) or remotely at a media guidance data source accessible via a communications network, (e.g., as described in FIG. 7). The mapping database may be organized such that each website for which a mapping is stored is stored as a separate table or object in the larger database.

Process 1000 continues to 1006, where control circuitry 604 determines whether a mapping exists in the data structure associated with the website for the media descriptor type. For example, control circuitry 604 queries the data structure associated with the website and retrieves the media descriptor types for which a mapping has been generated. Control circuitry 604 may then compare (e.g., by comparing the characters in a string of characters) to determine whether the media descriptor type determined on the webpage matches one in the database with an existing mapping.

If a mapping exists in the data structure associated with the website for the media descriptor, then process 1000 continues to 1010 where control circuitry 604 stores the association between the first path attribute and the media descriptor type as the mapping. For example, the database may be structured such that multiple path attributes can be associated with the media descriptor type. In this instance, control circuitry 604 would add the path attribute to the already existing mapping. In some embodiments, control circuitry 604 may overwrite the already existing path attribute and replace it with the new one.

If a mapping does not exist in the data structure associated with the website for the media descriptor, then process 1000 continues to 1008 where control circuitry 604 initializes a new mapping for the media descriptor. For example, control circuitry 604 creates a new entry in the data structure associated with the website. Process 1000 then continues to 1010, where control circuitry 604 stores the association between the first path attribute and the media descriptor type as the mapping, as described above.

Figure 11:
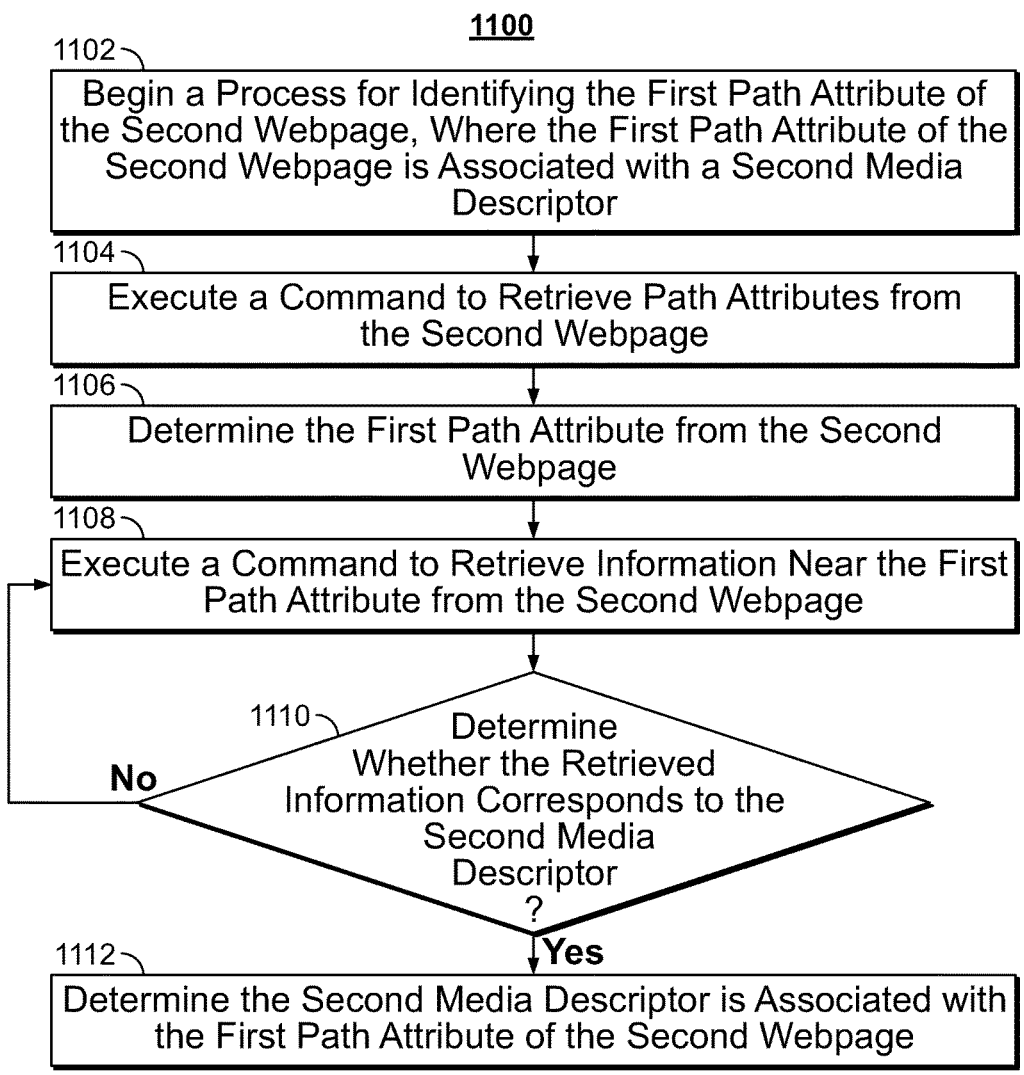
FIG. 11 is a flowchart of illustrative steps for identifying a path attribute on a webpage, in accordance with some embodiments of the disclosure.

FIG. 11 is a flowchart of illustrative steps for identifying a path attribute on a webpage, in accordance with some embodiments of the disclosure. For example, a media guidance application implementing process 1100 may be executed by control circuitry 604 (FIG. 6). Process 1100 begins at 1102, where control circuitry 604 begins a process for identifying the first path attribute of the second webpage, where the first path attribute of the second webpage is associated with a second media descriptor.

Process 1100 continues to 1104, where control circuitry 604 executes a command to retrieve path attributes from the second webpage. For example, control circuitry 604 may execute a script that includes instructions to query a webpage for a specific string of characters and return an expression containing those characters. Control circuitry 604 may query for a specific path attribute and determine a match (e.g., based on the characters of the query matching a string determined in the source code of the webpage). Alternatively or additionally, control circuitry 604 may retrieve the entire source code and segment it, as described above in FIG. 9, until a path attribute is determined.

Process 1100 continues to 1106, where control circuitry 604 determines the first path attribute from the second webpage. Based on the above retrieving, control circuitry 604 may determine a particular path attribute (e.g., structure tag 206 or structure tag 216) in the source code of the webpage, since the path attribute corresponds to a path attribute associated with a stored mapping (e.g., as described further in FIGS. 8 and 10).

Process 1100 continues to 1108, where control circuitry 604 executes a command to retrieve information near the first path attribute from the second webpage. For example, control circuitry 604 may execute a command to retrieve information (e.g., a string of characters) that immediately precedes the path attribute in the code. In some embodiments, control circuitry 604 retrieves information from a line immediately before the path attribute. In other embodiments, control circuitry 604 retrieves information from a line immediately after the path attribute. In other embodiments, control circuitry 604 retrieves information from after the path attribute.

Process 1100 continues to 1110, where control circuitry 604 determines whether the retrieved information corresponds to the second media descriptor. For example, control circuitry 604 may query the database containing verified media descriptors for a match with the retrieved information. If control circuitry 604 determines the retrieved information corresponds to the second media descriptor, process 1100 continues to 1112, where control circuitry 604 determines the second media descriptor is associated with the first path attribute of the second webpage.

If control circuitry 604 determines the retrieved information does not correspond to the second media descriptor, process 1100 returns to 1108, where control circuitry 604 executes a command to retrieve information near the first path attribute from the second webpage. For example, control circuitry 604 may retrieve information that is not related to a media descriptor, such as a news story. Control circuitry 604 may determine that this information is not relevant (e.g., based on a comparison with verified metadata associated with the first media asset as described in FIGS. 1 and 8) and execute a command to retrieve another piece of information from the webpage.

Figure 12:
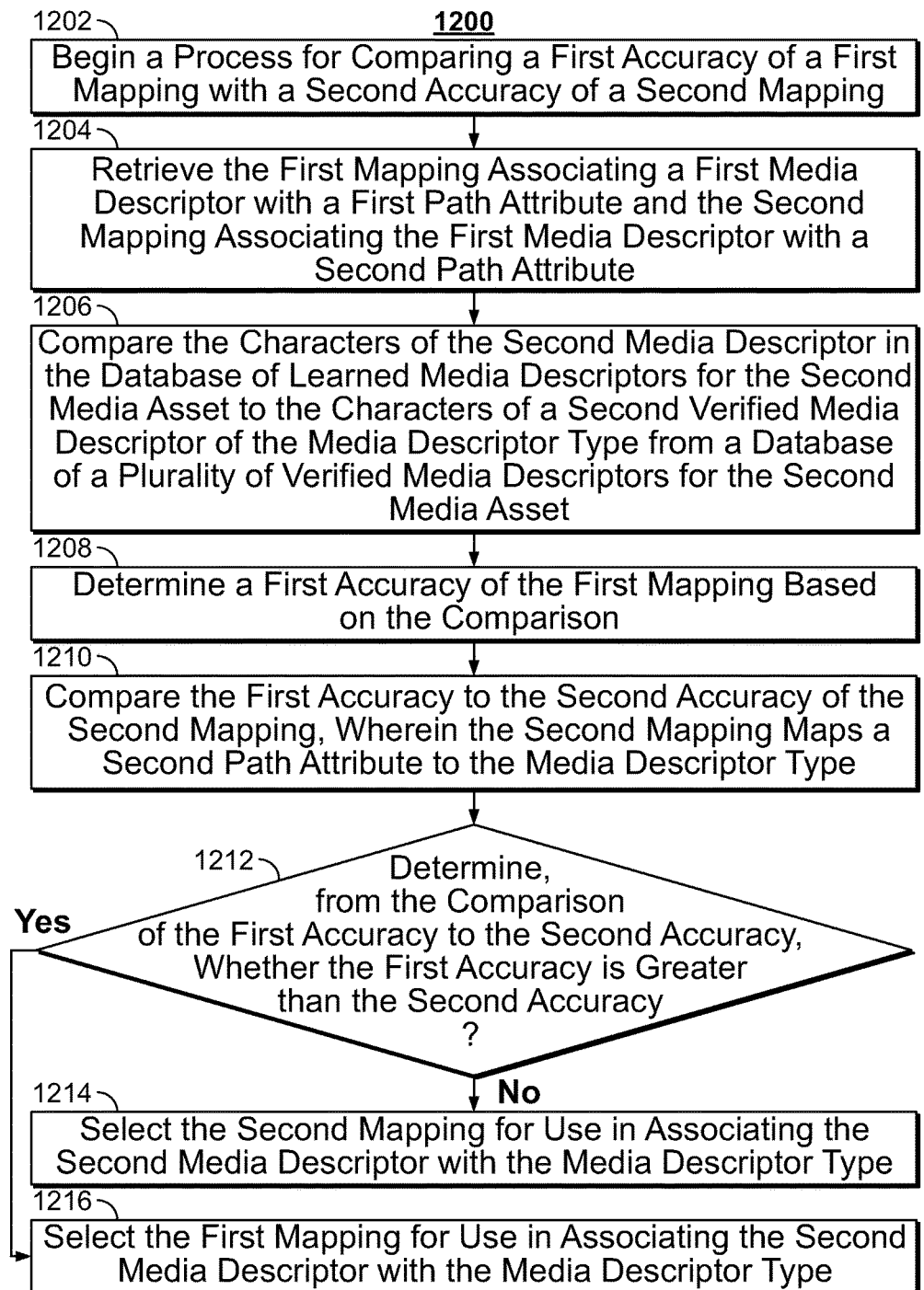
FIG. 12 is a flowchart of illustrative steps for comparing the accuracy of two different mappings, in accordance with some embodiments of the disclosure.

FIG. 12 is a flowchart of illustrative steps for comparing the accuracy of two different mappings, in accordance with some embodiments of the disclosure. For example, a media guidance application implementing process 1200 may be executed by control circuitry 604 (FIG. 6). Process 1200 begins at 1202, where control circuitry 604 begins a process for comparing a first accuracy of a first mapping with a second accuracy of a second mapping.

Process 1200 continues to 1204, where control circuitry 604 retrieves the first mapping associating a first media descriptor with a first path attribute and the second mapping associating the first media descriptor with a second path attribute. As described above in FIGS. 1-2 and 8-10, control circuitry 604 may generate mappings based on the associations of path attributes and media descriptor types. Control circuitry 604 may generate code that indicates that the media descriptor associated with the first path attribute in any webpage of the website is associated with the media descriptor type. For example, control circuitry 604 may generate code for first mapping 210 and second mapping 212 that provides instructions to the media guidance application on what path attributes to query for when crawling webpages of a website. The mappings may include a single path attribute, as in first mapping 210 where the "title" media descriptor type maps to the Xpath "/movie_listing/genre/title." Alternatively, the mappings may include multiple path attributes, as in second mapping 212, where the "title" media descriptor type maps to the Xpath "/movie_listing/genre/title," as well as the font color being red. Control circuitry 604 may store these mappings in a database, as described above. Control circuitry 604 may then retrieve the mappings at a later time for use associating media descriptors found on a webpage with media descriptor types.

Process 1200 continues to 1206, where control circuitry 604 compares the characters of the second media descriptor in the database of learned media descriptors for the second media asset to the characters of a second verified media descriptor of the media descriptor type from a database of a plurality of verified media descriptors for the second media asset. For example, the first mapping (e.g., first mapping 210) associates the "title" media descriptor type with a particular Xpath, as described above in FIG. 2, and control circuitry 604 retrieves a media descriptor (e.g., title 218, "22 Jump Street ©2014") from the source code of a webpage (e.g., webpage 214). Control circuitry 604 may store the metadata (e.g., title 218) determined from a webpage (e.g., webpage 214) in a database of learned media descriptors. Control circuitry 604 retrieves the second media descriptor (e.g., title 218) from the database of learned media descriptors and compares it to verified media descriptors (e.g., high quality meta data 104). Control circuitry 604 may perform the comparison by examining the indexed characters of each of the retrieved second media descriptor and the verified media descriptors. For example, control circuitry 604 may execute a script to parse through the retrieved descriptors by returning individual characters corresponding to indices in the string and comparing like indices. As an example, assuming skipping of white space, index [6] would return a first character "p" for title 218 and a second character "p" for the verified media descriptor for the title, "22 Jump Street."

Control circuitry 604 may compare the second media descriptor determined from the second mapping to verified media descriptors in an analogous manner. For example, the second mapping may relate a particular feature (e.g., color tag 220) to the path attributes outlined in the second mapping and control circuitry 604 retrieves a media descriptor (e.g., title 222, "©2014") from the source code of a webpage (e.g., webpage 214). Control circuitry 604 may perform the comparison by examining the indexed characters of each of the retrieved second media descriptor and the verified media descriptors. For example, control circuitry 604 may execute a script to parse through the retrieved descriptors by returning individual characters corresponding to indices in the string and comparing like indices. As an example, assuming skipping of white space, index [4] would return a first character "1" for title 222 and a second character "u" for the verified media descriptor for the title, "22 Jump Street."

Process 1200 continues to 1208, where control circuitry 604 determines a first accuracy of the first mapping based on the comparison. For example, since the characters of the second media descriptor (e.g., title 218, "22 Jump Street ©2014") include the second verified descriptor (e.g., "22 Jump Street"), but also includes additional characters, control circuitry 604 may determine the first accuracy of the first mapping is 5 out of a possible 10. In some embodiments, the accuracy could be tied to the number of unmatched characters between the second media descriptor and the verified media descriptor. Control circuitry 604 may determine the second accuracy in an analogous manner. For example, since the retrieved second media descriptor (e.g., title 222) does not include any portion of the second verified descriptor ("22 Jump Street"), control circuitry 604 may determine the accuracy is 0 out of a possible 10.

Process 1200 continues to 1210, where control circuitry 604 compares the first accuracy to the second accuracy of the second mapping, wherein the second mapping maps a second path attribute to the media descriptor type. For example, control circuitry 604 may determine the first mapping has an accuracy of 5 out of 10, where 10 is a perfect match and 0 indicates not a single character matched. Control circuitry 604 may generate mapping accuracies in such a way as to ensure that they are comparable, i.e., uses the same standards for generating any two mapping accuracies. If the mapping accuracies are represented by values, control circuitry 604 may compare the values to determine which mapping is more accurate.

Process 1200 continues to 1212, where control circuitry 604 determines, from the comparison of the first accuracy to the second accuracy, whether the first accuracy is greater than the second accuracy. For example, control circuitry 604 may determine that since 5 out of 10 indicates a stronger match between the second media descriptor and the verified media descriptor than 0 out of 10, the first mapping is more accurate than the second mapping. Control circuitry 604 may make this determination based upon predetermined rules and standards, as described above.

If control circuitry 604 determines the first accuracy is not greater than the second accuracy, process 1200 continues to 1214, where control circuitry 604 selects the second mapping for use in associating the second media descriptor with the media descriptor type. For example, if the first accuracy reflects a lesser percentage of characters matched (e.g., 80%) than that of the second accuracy (e.g., 100%), then control circuitry 604 may select the second mapping as the more accurate mapping for use when determining the second media descriptor on a webpage of a website.

If control circuitry 604 determines the first accuracy is greater than the second accuracy, process 1200 continues to 1216, where control circuitry 604 selects the first mapping for use in associating the second media descriptor with the media descriptor type. For example, if the first accuracy reflects a greater percentage of characters matched (e.g., 80%) than that of the second accuracy (e.g., 10%), then control circuitry 604 may select the first mapping as the more accurate mapping for use when determining the second media descriptor on a webpage of a website.

Figure 13:
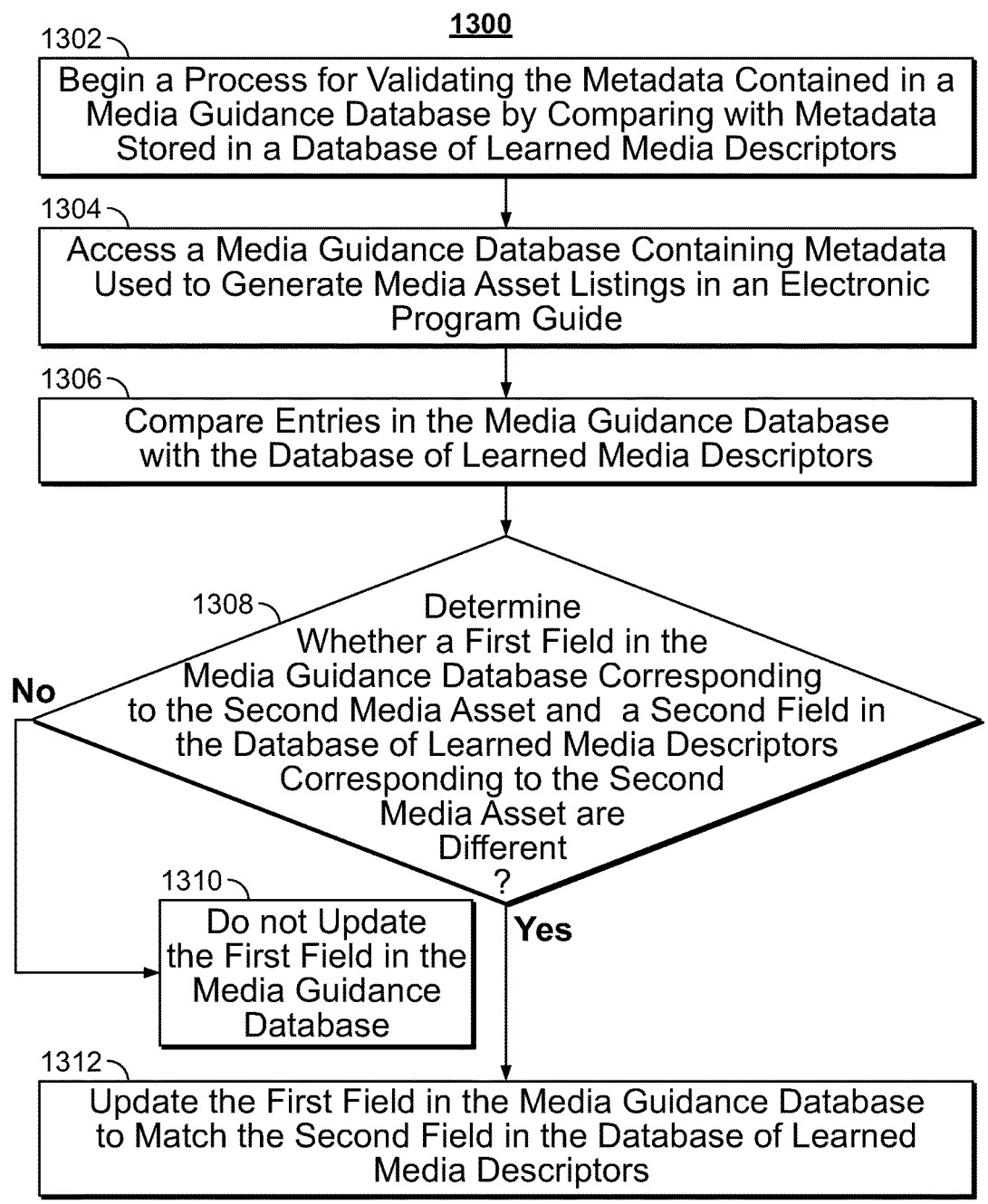
FIG. 13 is a flowchart of illustrative steps for verifying metadata, in accordance with some embodiments of the disclosure.

FIG. 13 is a flowchart of illustrative steps for verifying metadata, in accordance with some embodiments of the disclosure. For example, a media guidance application implementing process 1300 may be executed by control circuitry 604 (FIG. 6). Process 1300 begins at 1302, where control circuitry 604 begins a process for validating the metadata contained in a media guidance database by comparing with metadata stored in a database of learned media descriptors.

Process 1300 continues to 1304, where control circuitry 604 accesses a media guidance database containing metadata used to generate media asset listings in an electronic program guide. For example, control circuitry 604 may access a media guidance database (e.g., media guidance database 302) stored either locally in memory (e.g., storage 610) on a user equipment device (e.g., user equipment devices 702, 704, and/or 706) or remotely at a media guidance data source accessible via a communications network, (e.g., as described in FIG. 7).

Process 1300 continues to 1306, where control circuitry 604 compares entries in the media guidance database with the database of learned media descriptors. For example, control circuitry 604 may compare an entry for the movie, "The Martian" and its associated metadata (e.g., the name of an actor in the movie) stored in the media guidance database (e.g., media guidance database 302) with an entry also for "The Martian" stored in the database of learned media descriptors (e.g., database of learned media descriptors 314). In order to determine the two entries correspond, i.e., they are for the same media asset, control circuitry 604 may compare the titles, actors, or additional metadata stored in fields of the entries. Once control circuitry 604 determines the entries match (e.g., since header 304 matches title 322), control circuitry 604 may compare metadata stored in the media guidance database (e.g., media guidance database 302) and the database of learned media descriptors (e.g., database of learned media descriptors 314) with the goal of validating the data in the media guidance database, which may be used to populate program listings in an electronic program guide, as shown in FIGS. 4-5.

Process 1300 continues to 1308, where control circuitry 604 determines whether a first field in the media guidance database corresponding to the second media asset and a second field in the database of learned media descriptors corresponding to the second media asset are different. For example, control circuitry 604 may determine the media guidance database (e.g., media guidance database 302) lists a media descriptor (e.g., media descriptor 312, "Matt Dillon") as a media descriptor type (e.g., media descriptor type 310, "actor") in "The Martian," while the database of learned media descriptors (e.g., database of learned media descriptors 314) lists a media descriptor (e.g., media descriptor 326, "Matt Damon") as a media descriptor type (e.g., media descriptor type 324, "actor") in "The Martian." Control circuitry 604 may then determine that the two actor fields are different, as they contain different characters, based on a comparison algorithm (e.g., comparison 328) of the two media descriptors (e.g., media descriptor 326 and media descriptor 312).

In some embodiments, control circuitry 604 may retrieve a first stored descriptor from the first field. For example, control circuitry 604 may retrieve the first stored descriptor by executing a database query language script, such as SQL, and utilizing the declarative "Select" command to access data in a particular table or expression. Control circuitry 604 may retrieve a first stored descriptor, (e.g., media descriptor 312 "Matt Dillon" from media guidance database 302). Control circuitry 604 may retrieve a second stored descriptor from the second field. For example, control circuitry 604 may retrieve the second stored descriptor from the second field by executing a database query language script such as SQL, and utilizing the declarative "Select" command to access data in a particular table or expression. Control circuitry 604 may retrieve a second stored descriptor (e.g., media descriptor 326 "Matt Damon" from database of learned media descriptors 314). Control circuitry 604 may then compare corresponding characters of the first stored descriptor with those of the second stored descriptor. For example, control circuitry 604 may execute a script (e.g., to facilitate comparison 328) to parse through the retrieved descriptors by returning individual characters corresponding to indices in the string and comparing like indices. As an example, assuming skipping of white space, index [6] would return a first character "i" for media descriptor 312 and a second character "a" for media descriptor 326. Control circuitry 604 may determine the first character does not correspond to the second character by comparing the ASCII codes or any other method of comparing two characters. Control circuitry 604 may, in response to the first character of the first stored descriptor not corresponding to the second character of the second stored descriptor, determine the first entry and the second entry are different. For example, as described above, if control circuitry 604 determines any of the characters at a particular index do not match between media descriptor 312 and media descriptor 326, control circuitry 604 may determine that media descriptor 312 and media descriptor 326 are different.

If the first field in the media guidance database corresponding to the second media asset and the second field in the database of learned media descriptors corresponding to the second media asset are not different, process 1300 continues to 1310, where control circuitry 604 does not update the first field in the media guidance database. For example, control circuitry 604 may not need to update media guidance database 302, since the two fields are identical (e.g., the media descriptor in both databases for media descriptor type "actor" is "Matt Damon").

If the first field in the media guidance database corresponding to the second media asset and the second field in the database of learned media descriptors corresponding to the second media asset are different, process 1300 continues to 1312, where control circuitry 604 updates the first field in the media guidance database to match the second field in the database of learned media descriptors. For example, after determining that "Matt Dillon" (e.g., media descriptor 312) stored in a field in media guidance database 302 does not match "Matt Damon" (e.g., media descriptor 326) stored in a field in database containing learned media descriptors 314, control circuitry 604 may update media guidance database 302 to reflect the field stored in database containing learned media descriptors 314 (e.g., to "Matt Damon" from "Matt Dillon").

It is contemplated that the steps or descriptions of each of FIGS. 8-13 may be used with any other embodiment of this disclosure. In addition, the steps and descriptions described in relation to FIGS. 8-13 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-7 could be used to perform one or more of the steps in FIGS. 8-13.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method of automatically aggregating data from a webpage using a path attribute, the method comprising:
   retrieving a first webpage of a website, wherein the first webpage is associated with a first media asset;
   selecting, from a database of a plurality of verified media descriptors, a verified media descriptor for the first media asset, wherein each of the plurality of verified media descriptors is associated with one of a plurality of media descriptor types;
   locating a webpage element of the first webpage by matching the verified media descriptor to a first text in the webpage element;
   identifying a first path attribute of the webpage element;
   in response to identifying the first path attribute of the webpage element, generating a mapping of the first path attribute to a media descriptor type, wherein the media descriptor type is associated with the verified media descriptor;

retrieving a second webpage of the website, wherein the second webpage is associated with a second media asset;

identifying a second webpage element on the second webpage by locating the first path attribute in the second webpage element;

extracting a second text from the second webpage element;

associating a second media descriptor with the media descriptor type based on the mapping, wherein the second media descriptor comprises the second text; and storing the association of the second media descriptor with the media descriptor type in a database of learned media descriptors for the second media asset.

2. The method of claim 1, wherein the first path attribute includes:
 a path; and
 a format attribute which includes at least one of:
  a location;
  a font;
  a size; and
  a color.

3. The method of claim 1, wherein the database of the plurality of verified media descriptors for the first media asset is populated with manually verified media descriptors for the first media asset.

4. The method of claim 1, wherein generating the mapping of the first path attribute to the media descriptor type further comprises generating code that indicates that the first media descriptor type is associated with the first path attribute in any webpage of the website.

5. The method of claim 1, further comprising:
 comparing the second media descriptor in the database of learned media descriptors for the second media asset to a second verified media descriptor of the media descriptor type from a database of a plurality of verified media descriptors for the second media asset; and
 determining a first accuracy of the mapping based on the comparison.

6. The method of claim 5, further comprising:
 comparing the first accuracy to a second accuracy of a different mapping, wherein the different mapping maps a second path attribute to the media descriptor type; and
 in response to determining that the first accuracy is greater than the second accuracy, selecting the mapping for use in associating the second media descriptor with the media descriptor type.

7. The method of claim 6, wherein the first path attribute is randomly selected from a plurality of path attributes associated with a first media descriptor, wherein the first media descriptor is associated with the first media descriptor type.

8. The method of claim 7, wherein the first media descriptor is randomly selected from a plurality of media descriptors for the first media asset.

9. The method of claim 1, further comprising:
 accessing a media guidance database containing metadata used to generate media asset listings in an electronic program guide;
 comparing entries in the media guidance database with the database of learned media descriptors;
 determining whether a first field in the media guidance database corresponding to the second media asset and a second field in the database of learned media descriptors corresponding to the second media asset are different; and
 in response to determining that the first field is different than the second field, updating the first field in the media guidance database to match the second field in the database of learned media descriptors.

10. The method of claim 9, wherein determining whether the first field in the media guidance database corresponding to the second media asset and the second field in the database of learned media descriptors corresponding to the second media asset are different comprises:
 retrieving a first stored descriptor from the first field;
 retrieving a second stored descriptor from the second field;
 comparing corresponding characters of the first stored descriptor with those of the second stored descriptor; and
 in response to a first character of the first stored descriptor not corresponding to a second character of the second stored descriptor, determining the first field and the second field are different.

11. A system for automatically aggregating data from a webpage using a path attribute, the system comprising:
 control circuitry configured to:
  retrieve a first webpage of a website, wherein the first webpage is associated with a first media asset;
  select, from a database of a plurality of verified media descriptors, a verified media descriptor for the first media asset, wherein each of the plurality of verified media descriptors is associated with one of a plurality of media descriptor types;
  locate a webpage element of the first webpage by matching the verified media descriptor to a first text in the webpage element;
  identify a first path attribute of the webpage element;
  in response to identifying the first path attribute of the webpage element,
  generate a mapping of the first path attribute to a media descriptor type, wherein the media descriptor type is associated with the verified media descriptor;
  retrieve a second webpage of the website, wherein the second webpage is associated with a second media asset;
  identify a second webpage element on the second webpage by locating the first path attribute in the second webpage element;
  extract a second text from the second webpage element;
  associate a second media descriptor with the media descriptor type based on the mapping, wherein the second media descriptor comprises the second text; and
 storage circuitry configured to:
  store the association of the second media descriptor with the media descriptor type in a database of learned media descriptors for the second media asset.

12. The system of claim 11, wherein the first path attribute includes:
 a path; and
 a format attribute which includes at least one of:
  a location;
  a font;
  a size; and
  a color.

13. The system of claim 11, wherein the database of the plurality of verified media descriptors for the first media asset is populated with manually verified media descriptors for the first media asset.

14. The system of claim 11, wherein the control circuitry is configured to generate the mapping of the first path attribute to the media descriptor type by generating code that indicates that the first media descriptor type is associated with the first path attribute in any webpage of the website.

15. The system of claim 11, wherein the control circuitry is further configured to:
compare the second media descriptor in the database of learned media descriptors for the second media asset to a second verified media descriptor of the media descriptor type from a database of a plurality of verified media descriptors for the second media asset; and
determine a first accuracy of the mapping based on the comparison.

16. The system of claim 15, wherein the control circuitry is further configured to:
compare the first accuracy to a second accuracy of a different mapping, wherein the different mapping maps a second path attribute to the media descriptor type; and
in response to determining that the first accuracy is greater than the second accuracy, selecting the mapping for use in associating the second media descriptor with the media descriptor type.

17. The system of claim 16, wherein the first path attribute is randomly selected from a plurality of path attributes associated with a first media descriptor, wherein the first media descriptor is associated with the first media descriptor type.

18. The system of claim 17, wherein the first media descriptor is randomly selected from a plurality of media descriptors for the first media asset.

19. The system of claim 11, wherein the control circuitry is further configured to:

access a media guidance database containing metadata used to generate media asset listings in an electronic program guide;
compare entries in the media guidance database with the database of learned media descriptors;
determine whether a first field in the media guidance database corresponding to the second media asset and a second field in the database of learned media descriptors corresponding to the second media asset are different; and
in response to determining that the first field is different than the second field, update the first field in the media guidance database to match the second field in the database of learned media descriptors.

20. The system of claim 19, wherein the control circuitry configured to determine whether the first field in the media guidance database corresponding to the second media asset and the second field in the database of learned media descriptors corresponding to the second media asset are different is further configured to:
retrieve a first stored descriptor from the first field;
retrieve a second stored descriptor from the second field;
compare corresponding characters of the first stored descriptor with those of the second stored descriptor; and
in response to a first character of the first stored descriptor not corresponding to a second character of the second stored descriptor, determine the first field and the second field are different.

* * * * *